United States Patent Office 3,819,700
Patented June 25, 1974

3,819,700
2-(HYDROCARBYLTHIO) - 2 - (HYDROXYIMINO)-
ACETAMIDE S-OXIDES AND DERIVATIVES
Russell F. Bellina, 763 Montclair Drive, Apt. 10,
Claymont, Del. 19703
No Drawing. Continuation-in-part of abandoned application Ser. No. 31,391, Apr. 23, 1970. This application Mar. 5, 1971, Ser. No. 121,573
Int. Cl. C07c 103/12, 103/14, 103/22, 103/24
U.S. Cl. 260—561 S      12 Claims

ABSTRACT OF THE DISCLOSURE 2-(Hydrocarbylthio) - 2 - (hydroxyimino)-acetamido S-oxides and derivatives of the general formula:

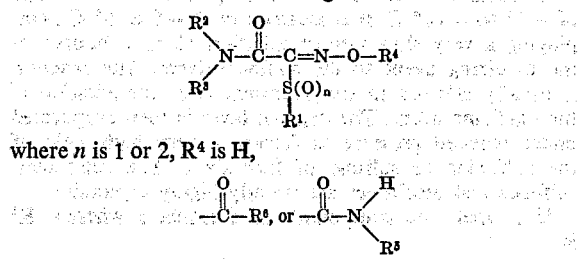

where $n$ is 1 or 2, $R^4$ is H, and $R^1$, $R^2$, $R^3$, $R^5$, and $R^6$ are as hereinafter defined, are useful as fungicides. The compounds are prepared by oxidation of the corresponding sulfides.

RELATED APPLICATIONS

This application is a continuation-in-part of application Ser. No. 31,391, filed Apr. 23, 1970, now abandoned.

BACKGROUND OF THE INVENTION

This invention relates to certain novel 2-(hydrocarbylthio)-2-(hydroxyimino)-acetamide S-oxides and the corresponding hydrocarbylcarbamoyloxyimino, hydrocarboylcarbonyloxyimino, and alkoxycarbonyloxyimino compounds, methods for their preparation, their use as fungicides, and compositions suitable for such use.

The closest known prior art, as far as the structure of the novel compounds is concerned, is Belgian Pat. 716,493, issued Dec. 13, 1968. That patent discloses certain 2-(hydrocarbylthio) - 2 - (hydrocarbylcarbamoyloxyimino)-acetamides, and their use to destroy pests such as insects, ticks, mites, and nematodes. Fungicidal activity of the compounds is not disclosed.

There are commercially available numerous chemical compounds which are fungicidally active, and which aid in preventing fungus-incited diseases in crops and ornamental plants. However all of these have practical deficiencies which restrict their use. Among the deficiencies are excessive phytotoxicity to certain crops, high cost, discomfort to the applicator, toxicity hazard to the applicator or the food-consuming public, inadequate or excessive residual life on the crop parts, lack of compatibility with other chemicals that need also to be applied to the crops, and unsuitability for desired type of formulation. Consequently, scientists continue to search for new fungicides with optimum combination of effectiveness, safety, compatibility, and economy.

Of the organisms responsible for diseases on agricultural crops, the fungi classed as Phycomycetes are among the most virulent. The disorders caused by this group of fungi include late blight of tomatoes and potatoes, downy mildews of grapes and cucurbits, and Pythium root rots.

This invention provides fungicidally active compounds which do exhibit a desirable combination of effectiveness, safety, compatibility and economy. Diseases caused by fungi of the class Phycomycetes are especially susceptible to control by compounds of this invention. However, many other fungus incited plant diseases are also controlled.

SUMMARY OF THE INVENTION

This invention comprises novel compounds of the formula:

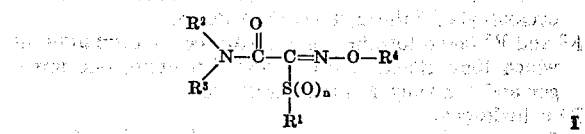

wherein:

$R^1$ is alkyl of 1 through 12 carbon atoms; alkyl of 3 through 12 carbon atoms substituted with 1 chlorine atom; alkenyl of 3 through 4 carbon atoms; cycloalkyl of 3 through 8 carbon atoms; cycloalkenyl of 5 through 8 carbon atoms; cycloalkylalkyl of 6 through 7 carbon atoms; phenyl; benzyl;

$$-CH_2\overset{O}{\overset{\|}{C}}OR^7,$$

wherein $R^7$ is alkyl of 1 through 6 carbon atoms, or

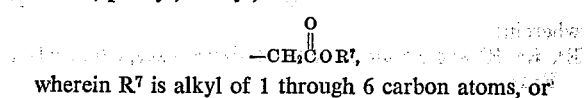

wherein $R^2$, $R^3$ and $R^4$ are as defined below, $p$ is 1 or 2 and $R^8$ is phenylene, xylylene or alkylene of 2 through 18 carbon atoms;

$R^2$ and $R^3$ are each separately selected from the group consisting of alkyl of 1 through 12 carbon atoms; alkenyl of 3 through 4 carbon atoms; cycloalkyl of 3 through 10 carbon atoms; cycloalkenyl of 5 through 8 carbon atoms; cycloalkylalkyl of 6 through 7 carbon atoms; phenyl; or benzyl; with the provisos that (1) only one of $R^2$ and $R^3$ can be phenyl or benzyl, and (2) the sum of carbon atoms in $R^2$ and $R^3$ can total no more than 12, except where both $R^2$ and $R^3$ are alkyl;

$R^2$ and $R^3$ taken together, along with the nitrogen atom to which they are attached, are a ring containing one nitrogen atom and 3 through 6 carbon atoms; or are a morpholino ring;

$R^4$ is

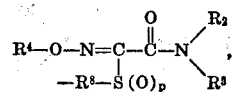

wherein $R^5$ is alkyl of 1 through 8 carbon atoms; propargyl; alkenyl of 3 through 4 carbon atoms; cycloalkyl of 3 through 8 carbon atoms; benzyl; phenyl; or phenyl substituted with 1 or 2 substituents selected from halogen, nitro, methoxy, and methyl;

$R^6$ is alkyl of 1 through 11 carbon atoms; alkyl of 1 through 11 carbon atoms substituted with up to three substituents selected from chlorine, bromine, fluorine, or with up to 2 substituents selected from alkoxy of 1 through 2 carbon atoms, or with one alkoxycarbonyl of 2 through 3 carbon atoms; cycloalkyl of 3 through 8 carbon atoms; alkenyl of 2 through 6 carbon atoms; cycloalkenyl of 4 through 8 carbon atoms; bicycloalkenyl of 7 through 10 carbon atoms; cycloalkenylalkyl of 5 through 11 carbon atoms; cycloalkylalkyl of 4 through 11 carbon atoms; bicycloalkyl of 7 through 9 carbon atoms; adamantyl; benzyl; alkoxy of 1 through 4 carbon atoms; alkoxy of 1 through 4 carbon atoms substituted with one bromine or chlorine, or with one alkoxy of 1 through 2 carbon atoms, or with one alkoxycarbonyl of 2 through 3 carbon atoms; and $n$ is 1 or 2.

Preferred because of higher activity are those compounds of formula I wherein:

$n$ is 2;

$R^1$ is alkyl of 1 through 10 carbon atoms, or cycloalkyl of 5 through 6 carbon atoms;

$R^2$ and $R^3$ are each separately selected from the group consisting of alkyl of 1 through 6 carbon atoms and cycloalkyl of 5 through 6 carbon atoms;

$R^2$ and $R^3$ taken together, along with the nitrogen atom to which they attached, are a ring containing one nitrogen and 4 through 6 carbon atoms; and $R^4$ is hydrogen.

The invention also includes a method of making a compound of formula I which comprises oxidizing a corresponding sulfide of the formulae:

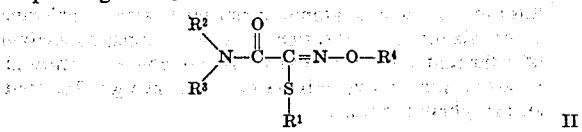

wherein:

$R^1$, $R^2$, $R^3$ and $R^4$ are as defined above, except that when $R^1$ is

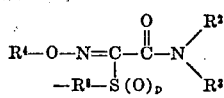

$p$ is 0.

Alternative methods for making the compounds of formula I wherein $R^4$ is

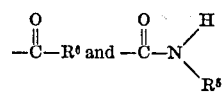

are also provided by this invention. Thus, a compound of formula II wherein $R^4$ is H is oxidized to the corresponding 2-hydroxyimino compound of formula I, then the latter compound is reacted with an acid halide of the formula

or an isocyanate of the formula $R^5NCO$.

This invention further encompasses a method of preventing injury due to fungi which comprises applying to the locus to be protected an effective amount of a compound of formula I, and fungicidal compositions comprising a fungicidally effective amount of a compound of formula I and a diluent and/or a surfactant.

DESCRIPTION OF THE INVENTION

The compounds of formula I are generally prepared by oxidation of the corresponding sulfide of formula II. The preferred oxidizing agent is a 40% solution of peracetic acid, although other conventional oxidizing agents such as m-chloroperbenzoic acid, 30% hydrogen peroxide, potassium permanganate, 1-chlorobenzotriazole, and nitric acid, can also be used. The oxidation reaction is illustrated by equation (A):

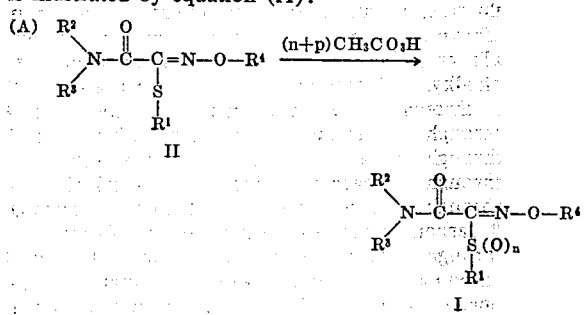

As indicated by the above, the number of equivalents of oxidizing agent used per equivalent of compound of formula II is equal to sum of $n$ and $p$ in the product of formula I. Compounds of formula II where $R^1$ is

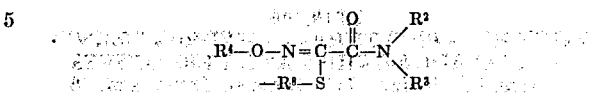

are ordinarily treated with four equivalents of the oxidizing agent to produce the corresponding disulfone, i.e., a compound of Formula I where $R^1$ is

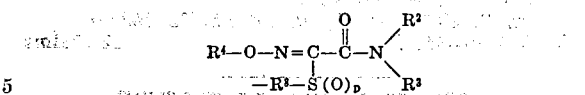

and $n$ and $p$ are both 2.

The reaction is conducted in an inert solvent such as chloroform or acetic acid at a temperature in the range of $-15$ to $+70°$ C. It is ideally run at $-5$ to $5°$ C., employing a very slow rate of addition (3 to 6 hours) of the oxidizing agent to the sulfide/solvent. The reaction is usually allowed to stir overnight after the addition of the oxidizing agent. The organic layer is then evaporated under reduced pressure to furnish a very high yield of the sulfoxide or sulfone of formula I. The sulfoxides, sulfones and disulfones are usually highly crystalline.

If desired, the compounds of formula I wherein $R^4$ is

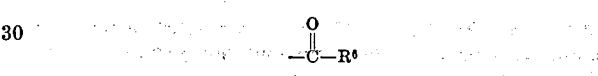

can alternativey be prepared by first preparing the sulfoxide or sulfone of formula I wherein $R^4$ is H, then reacting the product with an appropriate acid halide of the formula

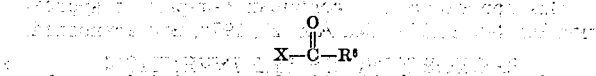

where X is halogen, preferably chlorine. The reaction of the acid chloride and the 2-(hydroxyimino)-2-(hydrocarbylthio)-acetamide S-oxide is carried out in a solvent such as acetonitrile which contains one equivalent of a base such as pyridine. The reaction is best conducted at a temperature of about $0°$ C., but may be carried out at any temperature in the range of about $-15°$ to $+80°$ C. When the reaction is complete (usually about 1 to 3 hours) the solvent is removed under reduced pressure, then the product is recrystallized from a solvent such as isopropanol. When the product is an oil, it is purified by dissolving in a solvent such as methylene chloride, washing with water, drying, and filtering. Removal of the solvent furnishes the product, often analytically pure. This reaction is illustrated by equation (B):

(B)

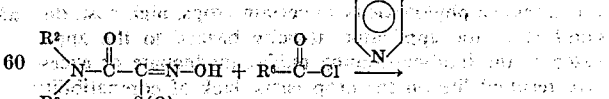
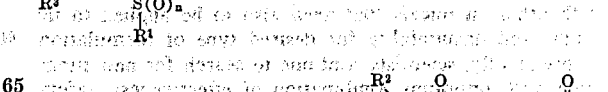
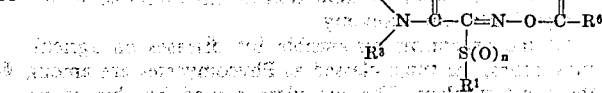

Similarly, the compounds of formula I wherein $R^4$ is

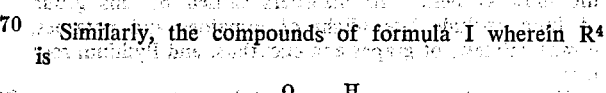
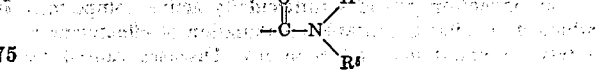

can alternatively be prepared by reacting an S-oxide of formula I wherein R⁴ is H with an isocyanate of the formula R⁵NCO in a solvent such as anhydrous acetonitrile which contains a catalytic amount of a base such as triethylamine or triethylenediamine. The reaction is mildly exothermic. Temperature is maintained in the range of 25 to 50° C. by cooling if necessary. Reaction is generally complete in 1 to 4 hours. The product is obtained in good yield by evaporation of the solvents. These carbamates of 2-(hydroxyimino)-2-(hydrocarbylthio)-acetamide S-oxides usually recrystallize well from isopropanol. This reaction is illustrated by equation (C):

(C)
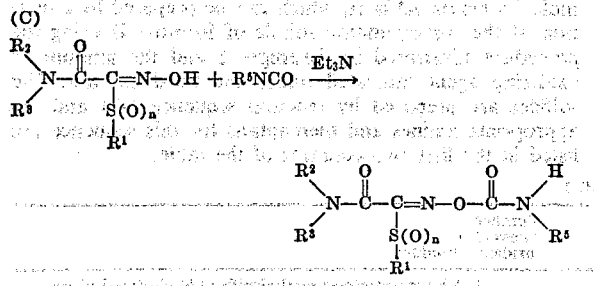

The sulfides of formula II wherein R⁴ is H are prepared by allowing diketene to react with an appropriate primary or secondary amine of the formula R₂R₃NH, treating the product with nitrous acid, then chlorinating with chlorine. The chlorination product is then allowed to react with a mercaptan followed by treatment with base such as sodium hydroxide. This process is illustrated by reaction sequence (D):

(D)
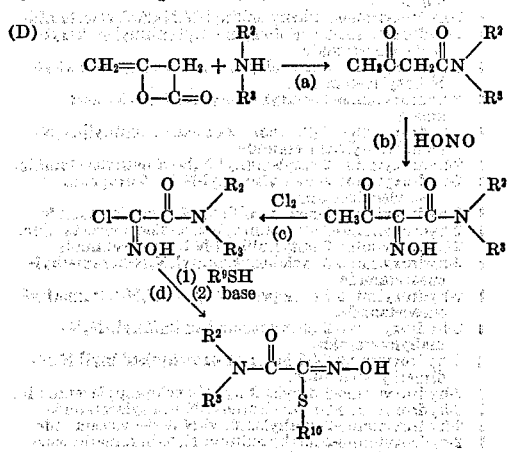

where R⁹ is the same as R¹ as defined above except that it cannot be

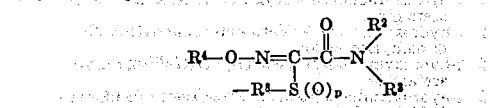

and it can additionally be —R⁸SH, where R⁸ is as defined above, and where R¹⁰ is the same as R¹ as defined above, except that when it is

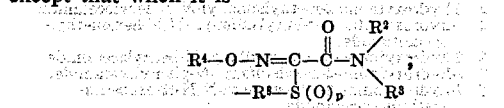

p must be 0.

The product of step (d) can then be converted into the corresponding compound of formula II wherein R⁴ is

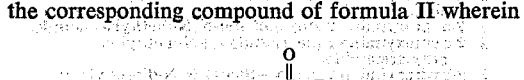

by reaction with an acid halide of the formula

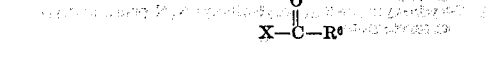

where X is halogen, preferably chlorine, or into the corresponding compound of formula II wherein R⁴ is

by reaction with an isocyanate of the formula R⁵NCO. The conditions for these reactions are in general the same as those described for the reactions illustrated by equations (B) and (C).

Preparation of the compounds of this invention is further illustrated by the following examples.

EXAMPLE 1

Preparation of 2-hydroxyimino-2-methylsulfonyl-N,N-dimethylacetamide

A mixture of 6.0 parts of 2-hydroxyimino-2-methylthio-N,N-dimethylacetamide and 120 parts of chloroform is cooled to —5° to +5°, and is treated dropwise with 14.8 parts of 40% peracetic acid over a 75 minute period. The reaction is then allowed to stir overnight at room temperature. The reaction mixture is concentrated to about ¼ its original volume and the product filtered. Recrystallization of this product from isopropanol gives 5.1 parts of 2-hydroxyimino-2-methylsulfonyl-N,N-dimethylacetamide, m.p. 180–180.5°.

EXAMPLE 2

Preparation of 2-hydroxyimino-2-cyclohexylsulfonyl-N,N-dimethylacetamide

Replacing the starting material of Example 1 with an equivalent amount of 2-hydroxyimino-2-cyclohexylthio-N,N-dimethylacetamide, there is obtained 2-hydroxyimino-2-cyclohexylsulfonyl - N,N - dimethylacetamide, which is recrystallized from water/isopropanol, 2/1, m.p. 188.5°.

EXAMPLE 3

Preparation of 2-hydroxyimino-2-octylsulfonyl-N,N-diethylacetamide

Replacing the starting material of Example 1 with an equivalent amount of 2-hydroxyimino-2-octylthio-N,N-diethylacetamide, there is obtained 2-hydroxyimino-2-octylsulfonyl-N,N-diethylamide, which is recrystallized from isopropanol/water, 3/2, m.p. 125–125.5°.

EXAMPLE 4

Preparation of 2-hydroxyimino-2-hexylsulfonyl-N,N-diethylacetamide

Replacing the starting materials of Example 1 with an equivalent amount of 2-hydroxyimino-2-hexylthio-N,N-diethylacetamide, there is obtained 2-hydroxyimino-2-hexylsulfonyl-N,N-diethylacetamide.

EXAMPLE 5

Preparation of 2-hydroxyimino-cyclohexylsulfonyl-N,N-(3-pentamethylene)acetamide Replacing the starting material of Example 1 with an equivalent amount of 2-hydroxyimino-cyclohexylthio-N, N-(3-pentamethylene)acetamide, there is obtained 2-hydroxyimino-cyclohexylsulfonyl-N,N-(3 - pentamethylene) acetamide, which is recrystallized from benzene.

EXAMPLE 6

Preparation of 2-hydroxyimino-2-octylsulfonyl-N,N-(3-tetramethylene)acetamide

Replacing the starting material of Example 1 with an equivalent amount of 2-hydroxyimino-2-octylthio-N,N-(3-tetramethylene)acetamide, there is obtained 2-hydroxyimino-2-octylsulfonyl-N,N-(3-tetramethylene)acetamide.

EXAMPLE 7

Preparation of 2-hydroxyimino-2-dodecylsulfonyl-N,N-diethylacetamide

Replacing the starting material of Example 1 with an equivalent amount of 2-hydroxyimino-2-dodecylthio-N,N-diethylacetamide, there is obtained 2-hydroxyimino-2-dodecylsulfonyl-N,N-diethylacetamide, which is recrystallized from acetonitrile.

EXAMPLE 8

Preparation of 2-hyroxyimino-2-methylsulfonyl-N,N-diethylacetamide

Replacing the starting material of Example 1 with an equivalent amount of 2-hydroxyimino-2-methylthio-N,N-diethylacetamide, there is obtained 2-hydroxyimino-2-methylsulfonyl-N,N-diethylacetamide, which is recrystallized from hexane/isopropanol, 5/1, m.p. 162.5–163°.

EXAMPLE 9

Preparation of 2-hyroxyimino-2-benzylsulfonyl-N,N-diethylacetamide

Replacing the starting material of Example 1 with an equivalent amount of 2-hydroxyimino-2-benzylthio-N,N-diethylacetamide, there is obtained 2-hydroxyimino-2-benzylsulfonyl-N,N-diethylacetamide, which is recrystallized from hexane/isopropanol, 5/1, m.p. 158.5–159°.

Table I contains a listing, under the column headed "Product", of a number of sulfoxides and sulfones of formula I wherein $R^4$ is H, which can be prepared by oxidation of the corresponding sulfide of formula II using the procedure illustrated by Example 1 and the amount of oxidizing agent indicated under the third column. The sulfides are prepared by reaction sequence (D) and the appropriate amines and mercaptans for this sequence are listed in the first two columns of the table.

TABLE I

| Amine | Mercaptan | Number moles of oxidant | Product |
|---|---|---|---|
| Dimethylamine | Methyl mercaptan | 1 | 2-hydroxyimino-2-methylsulfinyl-N,N-dimethylacetamide. |
| Diodecylamine | Dodecyl mercaptan | 1 | 2-hydroxyimino-2-dodecylsulfinyl-N,N-diodecylacetamide. |
| Dimethylamine | 3-chloropropyl mercaptan | 1 | 2-hydroxyimino-2-(3-chloropropylsulfinyl)-N,N-dimethylacetamide. |
| Do | Allyl mercaptan | 1 | 2-hydroxyimino-2-allylsulfinyl-N,N-dimethylacetamide. |
| Do | Cyclohexyl mercaptan | 1 | 2-hydroxymino-2-cyclohexylsulfinyl-N,N-dimethylacetamide. |
| Diethylamine | sec-Butyl mercaptan | 1 | 2-hydroxyimino-2-sec-butylsulfinyl-N,N-diethylacetamide. |
| Diisopropylamine | Benzyl mercaptan | 1 | 2-hydroxyimino-2-benzylsulfinyl-N,N-diisopropylacetamide. |
| Diethylamine | Phenyl mercaptan | 1 | 2-hydroxyimino-2-phenylsulfinyl-N,N-diethylacetamide |
| N-hexyldecylamine | Cyclohexanemethyl mercaptan | 1 | 2-hydroxyimino-2-cyclohexylmethyl-sulfinyl-N-hexyl-N-decylacetamide. |
| N-methylbutylamine | 3-cyclopentenyl mercaptan | 1 | 2-hydroxyimino-2-(3-cyclopentenylsulfinyl)-N-methyl-N-butylacetamide. |
| Diethylamine | t-Butyl mercaptan | 1 | 2-hydroxyimino-2-t-butylsulfinyl-N,N-diethylacetamide. |
| Piperidine | Ethyl 2-mercaptoacetate | 1 | 2-hydroxyimino-2-[(2-ethoxy-2-oxoethyl)sulfinyl]-N,N-pentamethyleneacetamide. |
| Dimethylamine | Octyl mercaptan | 1 | 2-hydroxyimino-2-octylsulfinyl-N,N-dimethylacetamide. |
| Morpholine | Methyl mercaptan | 1 | 2-hydroxyimino-2-methylsulfinyl-N,N-(3-oxapentamethylene)acetamide. |
| Aniline | do | 1 | 2-hydroxyimino-2-methylsulfinyl-N-phenylacetamide. |
| Diododecylamine | Ethyl mercaptan | 1 | 2-hydroxyimino-2-ethylsulfinyl-N,N-diodecylacetamide. |
| Benzylamine | Butyl mercaptan | 1 | 2-hydroxyimino-2-butylsulfinyl-N-benzylacetamide. |
| Hexamethylene imine | Cyclohexyl mercaptan | 1 | 2-hydroxyimino-2-cyclohexylsulfinyl-N,N-hexamethyleneacetamide. |
| Pyrrolidine | Cyclopentyl mercaptan | 1 | 2-hydroxyimino-2-cyclopentylsulfinyl-N,N-tetramethyleneacetamide. |
| Diallylamine | 4-chlorooctadecyl mercaptan | 1 | 2-hydroxyimino-2-(4-chlorooctadecylsulfinyl)-N,N-diallylacetamide. |
| Dimethylamine | Hexyl 2-mercaptoacetate | 1 | 2-hydroxyimino-2-[(2-hexoxy-2-oxoethyl)sulfinyl]-N,N-dimethylacetamide. |
| Cyclopropylamine | Decyl mercaptan | 1 | 2-hydroxyimino-2-decylsulfinyl-N-cyclopropylacetamide. |
| t-Butylamine | t-Butyl mercaptan | 1 | 2-hydroxyimino-2-t-butylsulfinyl-N-t-butylacetamide. |
| Dodocylamine | Methyl mercaptan | 1 | 2-hydroxyimino-2-methylsulfinyl-N-dodecylacetamide. |
| Hexamethyleneimine | do | 1 | 2-hydroxyimino-2-methylsulfinyl-N,N-hexamethyleneacetamide. |
| Piperidine | Isopropyl mercaptan | 1 | 2-hydroxyimino-2-isopropylsulfinyl-N,N-pentamethyleneacetamide. |
| Dimethylamine | Dodecyl mercaptan | 2 | 2-hydroxyimino-2-dodecylsulfonyl-N,N-dimethylacetamide. |
| Do | 3-chloropropyl mercaptan | 2 | 2-hydroxyimino-2-(3-chloropropylsulfonyl)-N,N-dimethylacetamide. |
| Diisopropylamine | Decyl mercaptan | 2 | 2-hydroxyimino-2-decylsulfonyl-N,N-diisopropylacetamide. |
| Dimethylamine | Methyl-2-mercaptoacetate | 2 | 2-hydroxyimino-2-[(2-methoxy-2-oxoethyl)sulfonyl]-N,N-dimethyl-acetamide. |
| Cyclohexanemethylamine | Ethyl-2-mercaptoacetate | 2 | 2-hydroxyimino-2-[(2-ethoxy-2-oxoethyl)sulfonyl]-N-(cyclohexylmethyl)acetamide. |
| Cyclopentanemethylamine | Cyclohexyl mercaptan | 2 | 2-hydroxyimino-2-cyclohexylsulfonyl-N-(cyclopentylmethyl)acetamide. |
| Dodecylamine | Methyl mercaptan | 2 | 2-hydroxyimino-2-methylsulfonyl-N-dodecylacetamide. |
| Hexamethyleneimine | t-Butyl mercaptan | 2 | 2-hydroxyimino-2-(t-butylsulfonyl)-N,N-hexamethyleneacetamide. |
| Benzylamine | Benzyl mercaptan | 2 | 2-hydroxyimino-2-benzylsulfonyl-N-benzylacetamide. |
| Aniline | Hexyl mercaptan | 2 | 2-hydroxyimino-2-hexylsulfonyl-N-phenylacetamide. |
| Morpholine | Allyl mercaptan | 2 | 2-hydroxyimino-2-allylsulfonyl-N,N-(3-oxapentamethylen)acetamide. |
| t-Butylamine | 3-cyclopentenyl mercaptan | 2 | 2-hydroxyimino-2-(3-cyclopentenylsulfonyl)-N-t-butylacetamide. |
| Allylamine | Cyclohexanemethyl mercaptan | 2 | 2-hydroxyimino-2-cyclohexylmethylsulfonyl-N-allylacetamide. |
| Diethylamine | Ethyl mercaptan | 2 | 2-hydroxyimino-2-ethylsulfonyl-N,N-diethylacetamide. |
| N-methylbutylamine | Phenyl mercaptan | 2 | 2-hydroxyimino-2-phenylsulfonyl-N-methyl-N-butylacetamide. |
| Dipropylamine | do | 2 | 2-hydroxyimino-2-phenylsulfonyl-N,N-dipropylacetamide. |
| Do | Methyl mercaptan | 2 | 2-hydroxyimino-2-methylsulfonyl-N,N-dipropylacetamide. |
| Do | t-Butyl mercaptan | 2 | 2-hydroxyimino-2-t-butylsulfonyl-N,N-dipropylacetamide. |
| Piperidine | Dodecyl mercaptan | 2 | 2-hydroxyimino-2-dodecylsulfonyl-N,N-pentamethyleneacetamide. |

TABLE I—Continued

| Amine | Mercaptan | Number moles of oxidant | Product |
|---|---|---|---|
| Aziridine | Allyl mercaptan | 2 | 2-hydroxyimino-2-allylsulfonyl-N,N-dimethyleneacetamide. |
| Do | 3-chloropropyl mercaptan | 2 | 2-hydroxyimino-2-(3-chloropropylsulfonyl)-N,N-dimethyleneacetamide. |
| Cyclooctylamine | Methyl mercaptan | 2 | 2-hydroxyimino-2-methylsulfonyl-N-cyclooctylacetamide. |
| 2-cyclooctenylamine | do | 2 | 2-hydroxyimino-2-methylsulfonyl-N-(2-cyclooctenyl)acetamide. |
| 2-butenylamine | do | 2 | 2-hydroxyimino-2-methylsulfonyl-N-(2-butenyl)acetamide. |
| 2-cyclopentenylamine | Cyclohexyl mercaptan | 2 | 2-hydroxyimino-2-cyclohexylsulfony-N-(2-cyclopentenyl)acetamide. |
| N-methylcyclodecylamine | Cyclooctyl mercaptan | 1 | 2-hydroxyimino-2-cyclooctylsulfinyl-N-methyl-N-cyclodecylacetamide. |
| N-ethylbenzylamine | Cyclopropyl mercaptan | 2 | 2-hydroxyimino-2-cyclopropylsulfonyl-N-ethyl-N-benzylacetamide. |
| Cyclopentanemethylamine | Cyclopentanemethyl mercaptan | 2 | 2-hydroxyimino-2-(2-cyclopentanemethylsulfonyl)-N-(cyclopentylmethyl)acetamide. |
| Dipropylamine | 4-cyclooctenyl mercaptan | 1 | 2-hydroxyimino-2-(4-cyclooctenylsulfinyl)-N,N-dipropylacetamide. |
| Piperidine | Allyl mercaptan | 2 | 2-hydroxyimino-2-allylsulfonyl-N,N-pentamethyleneacetamide. |

EXAMPLE 10

Preparation of the methylcarbamate of 2-hydroxyimino-2-methylsulfonyl-N,N-dimethylacetamide A solution of 14.0 parts of the methyl carbamate of 2-hydroxyimino-2-methylthio-N,N-dimethylacetamide and 270 parts of chloroform is cooled to −5 to +5° and treated with 25.6 parts of 40% peracetic acid over a 75 minute period. The reaction is then allowed to stir at room temperature overnight. The chloroform layer is separated, dried, and evaporated to furnish a white solid which is washed thoroughly with ether. Recrystallization of the product from isopropanol furnishes 13.0 parts of the methyl carbamate of 2-hydroxyimino-2-methylsulfonyl-N,N-dimethylacetamide, m.p. 178–179°.

EXAMPLE 11

Preparation of the methylcarbamate of 2-hydroxyimino-2-cyclohexylsulfonyl-N,N-dimethylacetamide Replacing the starting material of Example 10 with an equivalent amount of the methylcarbamate of 2-hydroxyimino - 2 - cyclohexylthio-N,N-dimethylacetamide, there is obtained the methylcarbamate of 2-hydroxyimino-2-cyclohexylsulfonyl-N,N-dimethylacetamide, m.p. 154.5–155°.

EXAMPLE 12

Preparation of the methylcarbamate of 2-hydroxyimino-2-methylsulfonyl-N,N-hexamethyleneacetamide Replacing the starting material of Example 10 with an equivalent amount of the methylcarbamate of 2-hydroxyimino-2-methylthio-N,N-hexamethyleneacetamide, there is obtained the methylcarbamate of 2-hydroxyimino-2-methylsulfonyl-N,N-hexamethyleneacetamide, m.p. 188°.

EXAMPLE 13

Preparation of the methylcarbamate of 2-hydroxyimino-2-sec-butylsulfonyl-N,N-dimethylacetamide Replacing the starting material of Example 10 with an equivalent amount of the methylcarbamate of 2-hydroxyimino-2-sec-butylthio-N,N-dimethylacetamide, there is obtained the methylcarbamate of 2-hydroxy-2-sec-butylsulfonyl-N,N-dimethylacetamide, m.p. 114.5–115°.

EXAMPLE 14

Preparation of the methylcarbamate of 2-hydroxyimino-2-methylsulfonyl-N,N-diethylacetamide Replacing the starting material of Example 10 with an equivalent amount of the methylcarbamate of 2-hydroxyimino-2-methylthio-N,N-diethylacetamide, there is obtained the methylcarbamate of 2-hydroxyimino-2-methylsulfonyl-N,N-diethylacetamide.

EXAMPLE 15

Preparation of the p-bromocarbanilate of 2-hydroxyimino-2-methylsulfonyl-N,N-dimethylacetamide Replacing the starting material of Example 10 with an equivalent amount of the p-bromocarbanilate of 2-hydroxyimino-2-methylthio-N,N-dimethylacetamide, there is obtained the p-bromocarbanilate of 2-hydroxyimino-2-methylsulfonyl - N,N - dimethylacetamide, m.p. 158.5–159°.

EXAMPLE 16

Preparation of the o-chlorocarbanilate of 2-hydroxyimino-2-methylsulfonyl-N,N-dimethylacetamide Replacing the starting material of Example 10 with an equivalent amount of the o-chlorocarbanilate of 2-hydroxyimino-2-methylthio-N,N-dimethylacetamide, there is obtained the o-chlorocarbanilate of 2-hydroxyimino-2-methylsulfonyl-N,N-dimethylacetamide, m.p. 112–113.5°.

EXAMPLE 17

Preparation of the hexylcarbamate of 2-hydroxyimino-2-methylsulfonyl-N,N-dimethylacetamide Replacing the starting material of Example 10 with an equivalent amount of the hexylcarbamate of 2-hydroxyimino-2-methylthio-N,N-dimethylacetamide, there is obtained the hexylcarbamate of 2-hydroxyimino-2-methylsulfonyl-N,N-dimethylacetamide, which is recrystallized from ether, m.p. 81–81.5°.

EXAMPLE 18

Preparation of the methylcarbamate of 2-hydroxyimino-2-methylsulfinyl-N,N-dimethylacetamide A solution of 50.0 parts of the methylcarbamate of 2-hydroxyimino - 2-methylthio-N,N-dimethylacetamide and 750 parts of chloroform is cooled to −5° to +5°, and is treated with 40.0 parts of 40% peracetic acid over a 3½ hour period. The reaction is then allowed to stir at room temperature overnight. The chloroform layer is separated, dried, and evaporated giving an oil which crystallizes on standing. The solid is powdered and washed thoroughly with ether. Recrystallization of the product from benzene/chloroform, 2/1 gives 50.3 parts of the methylcarbamate of 2-hydroxyimino-2-methylsulfinyl-N,N-dimethylacetamide, m.p. 135°.

Table II contains a listing, under the column headed "Product," of various compounds of formula I wherein $R^4$ is

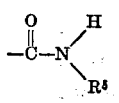

The compounds are made by oxidizing the corresponding sulfide of formula II by the procedures illustrated by Examples 10 and 18. The sulfides are prepared by the reactions illustrated in reaction sequence (D), followed by reaction of the 2-(hydrocarbylthio)-2-(hydroxyamino) acetamide with an isocyanate R⁵NCO. The amines and mercaptans used in steps (a) and (d) of reaction sequence (D) are listed in the first column of Table II, the isocyanate used is listed in the third column, and the number of moles of oxidant is listed in the third column.

TABLE II

| Amine (mercaptan) | Number moles of oxidant | Isocyanate | Product |
|---|---|---|---|
| Dimethylamine (methyl mercaptan). | 1 | Ethyl isocyanate | Ethylcarbamate of 2-hydroxyimino-2-methylsulfinyl-N,N-dimethylacetamide. |
| Dimethylamine (dodecyl mercaptan). | 1 | Methyl isocyanate | Methylcarbamate of 2-hydroxyimino-2-dodecylsulfinyl-N,N-dimethylacetamide. |
| Dimethylamine (3-chloropropyl mercaptan). | 1 | Isopropyl isocyanate | Isopropylcarbamate of 2-hydroxyimino-2-(3-chloropropylsulfinyl)-N,N-dimethylacetamide. |
| Dimethylamine (allyl mercaptan). | 1 | do | Isopropylcarbamate of 2-hydroxyimino-2-allylsulfinyl-N,N-dimethylacetamide. |
| Dimethylamine (cyclohexyl mercaptan). | 1 | Butyl isocyanate | Butylcarbamate of 2-hydroxyimino-2-cyclohexylsulfinyl-N,N-dimethylacetamide. |
| Diethylamine (sec-butyl mercaptan). | 1 | Methyl isocyanate | Methylcarbamate of 2-hydroxyimino-2-sec-butylsulfinyl-N,N-diethylacetamide. |
| Diisopropylamine (benzyl mercaptan). | 1 | Propargyl isocyanate | Propargylcarbamate of 2-hydroxyimino-2-benzylsulfinyl-N,N-diisopropylacetamide. |
| Diethylamine (phenyl mercaptan). | 1 | Cyclopropyl isocyanate | Cyclopropylcarbamate of 2-hydroxyimino-2-phenylsulfinyl-N,N-diethylacetamide. |
| N-methylpropylamine (cyclohexanemethyl mercaptan). | 1 | do | Cyclopropylcarbamate of 2-hydroxyimino-2-cyclohexylmethylsulfinyl-N-methyl-N-propylacetamide. |
| Dimethylamine (methyl mercaptan). | 1 | 3,4-dichlorophenyl isocyanate. | 3,4-dichlorocarbanilate of 2-hydroxyimino-2-methylsulfinyl-N,N-dimethylacetamide. |
| Dimethylamine (decyl mercaptan). | 1 | Cyclohexyl isocyanate | Cyclohexylcarbamate of 2-hydroxyimino-2-decylsulfinyl-N,N-dimethylacetamide. |
| Dimethylamine (3-chloropropyl mercaptan). | 1 | p-Iodophenyl isocyanate | p-Iodocarbanilate of 2-hydroxyimino-2-(3-chloropropylsulfinyl)-N,N-dimethylacetamide. |
| Dimethylamine (allyl mercaptan). | 1 | p-Fluorophenyl isocyanate. | p-Fluorocarbanilate of 2-hydroxyimino-2-allylsulfinyl-N,N-dimethylacetamide. |
| Dimethylamine (cyclohexyl mercaptan). | 1 | 3-methylphenyl isocyanate. | 3-methylcarbanilate of 2-hydroxyimino-2-cyclohexylsulfinyl-N,N-dimethylacetamide. |
| Diethylamine (sec-butyl mercaptan). | 1 | Hexyl isocyanate | Hexylcarbamate of 2-hydroxyimino-2-sec-butylsulfonyl-N,N-diethylacetamide. |
| Diisopropylamine (benzyl mercaptan). | 1 | Phenyl isocyanate | Carbanilate of 2-hydroxyimino-2-benzylsulfinyl-N,N-diisopropylacetamide. |
| Diethylamine (phenyl mercaptan). | 1 | p-Nitrophenyl isocyanate. | p-Nitrocarbanilate of 2-hydroxyimino-2-phenylsulfinyl-N,N-diethylacetamide. |
| N-methylpropylamine (cyclohexanemethyl mercaptan). | 1 | 2-methoxyphenyl isocynate. | 2-methoxycarbanilate of 2-hydroxyimino-2-cyclohexylmethylsulfinyl)-N-methyl-N-propylacetamide. |
| Dimethylamine (methyl mercaptan). | 1 | Benzyl isocyanate | Benzylcarbamate of 2-hydroxyimino-2-methylsulfinyl-N,N-dimethylacetamide. |
| Dimethylamine (dodecyl mercaptan). | 1 | Octyl isocyanate | Octylcarbamate of 2-hydroxyimino-2-dodecylsulfinyl-N,N-dimethylacetamide. |
| Dimethylamine (3-chloropropyl mercaptan). | 1 | Allyl isocyanate | Allylcarbamate of 2-hydroxyimino-2-(3-chloropropylsulfinyl)-N,N-dimethylacetamide. |
| Dimethylamine (allyl mercaptan). | 1 | Propargyl isocyanate | Propargylcarbamate of 2-hydroxyimino-2-allylsulfinyl-N,N-dimethylacetamide. |
| Dimethylamine (cyclohexyl mercaptan). | 1 | 3,5-dinitrophenyl isocyanate. | 3,5-dinitrocarbanilate of 2-hydroxyimino-2-cyclohexylsulfinyl-N,N-dimethylacetamide. |
| Diethylamine (sec-butyl mercaptan). | 1 | 3,4-diiodophenyl isocyanate. | 3,4-diiodocarbanilate of 2-hydroxyimino-2-sec-butylsulfinyl-N,N-diethylacetamide. |
| Diisopropylamine (benzyl mercaptan). | 1 | 3-nitro-4-chlorophenyl isocyanate. | 3-nitro-4-chlorocarbanilate of 2-hydroxyimino-2-benzylsulfinyl-N,N-diisopropylacetamide. |
| Diethylamine (phenyl mercaptan). | 1 | 3-butenyl isocyanate | 3-butenylcarbamate of 2-hydroxyimino-2-phenylsulfinyl-N,N-diethylacetamide. |
| N-methylpropylamine (cyclohexanemethyl mercaptan). | 1 | Cyclooctyl isocyanate | Cyclooctylcarbamate of 2-hydroxyimino-2-cyclohexylmethylsulfinyl)-N-methyl-N-propylacetamide. |
| N-methylbutylamine (3-cyclopentenyl mercaptan). | 1 | Ethyl isocyanate | Ethylcarbamate of 2-hydroxyimino-2-(3-cyclopentenylsulfinyl)-N-methyl-N-butylacetamide. |
| Diethylamine (t-butyl mercaptan). | 1 | Methyl isocyanate | 2-hydroxyimino-2-t-butylsulfinyl-N,N-diethylacetamide. |
| Piperidine (ethyl 2-mercaptoacetate). | 1 | Isopropyl isocyanate | Isopropylcarbamate of 2-hydroxyimino-2-[(2-ethoxy-2-oxoethyl)-sulfinyl]-N,N-pentamethyleneacetamide. |
| Dimethylamine (octyl mercaptan). | 1 | do | Isopropylcarbamate of 2-hydroxyimino-2-octylsulfinyl-N,N-dimethylacetamide. |
| Morpholine (methyl mercaptan). | 1 | Butyl isocyanate | Butylcarbamate of 2-hydroxyimino-2-methylsulfinyl-N,N-(3-oxapentamethylene)acetamide. |
| Aniline (methyl mercaptan). | 1 | Methyl isocyanate | Methylcarbamate of 2-hydroxyimino-2-methylsulfinyl-N-phenylacetamide. |
| Didodecylamine (ethyl mercaptan). | 1 | do | Methylcarbamate of 2-hydroxyimino-2-ethylsulfinyl-N,N-didodecylacetamide. |
| Benzylamine (butyl mercaptan). | 1 | 3,4-difluorophenyl isocyanate. | 3,4-difluorocarbanilate of 2-hydroxyimino-2-butylsulfinyl-N-benzylacetamide. |
| Hexamethylene imine (cyclohexyl mercaptan). | 1 | do | 3,4-difluorocarbanilate of 2-hydroxyimino-2-cyclohexylsulfinyl-N,N-hexamethyleneacetamide. |
| N-methylbutylamine (3-cyclopentenyl mercaptan). | 1 | 3,4-dichlorophenyl isocyanate. | 3,4-dichlorocarbanilate of 2-hydroxyimino-2-(3-cyclopentenylsulfinyl)-N-methyl-N-butylacetamide. |
| Diethylamine (t-butyl mercaptan). | 1 | Cyclohexyl isocyanate | Cyclohexylcarbamate of 2-hydroxyimino-2-t-butylsulfinyl-N,N-diethylacetamide. |
| Piperdine (ethyl 2-mercaptoacetate). | 1 | Phenyl isocyanate | Carbanilate of 2-hydroxyimino-2-[(2-ethoxy-2-oxoethyl)-sulfinyl-N,N-pentamethyleneacetamide. |
| Dimethylamine (octyl mercaptan). | 1 | p-Fluorophenyl isocyanate. | p-Fluorocarbanilate of 2-hydroxyimino-2-octylsulfinyl-N,N-dimethylacetamide. |
| Morpholine (methyl mercaptan). | 1 | p-Methylphenyl isocyanate. | p-Methylcarbamate of 2-hydroxyimino-2-methylsulfinyl-N,N-(3-oxapentamethyleneacetamide. |
| Aniline (methyl mercaptan). | 1 | Hexyl isocyanate | Hexylcarbamate of 2-hydroxyimino-2-methylsulfinyl-N-phenylacetamide. |
| Didecylamine (ethyl mercaptan). | 1 | 3-bromophenyl isocyanate. | 3-bromocarbanilate of 2-hydroxyimino-2-ethylsulfinyl-N,N-didecylacetamide. |
| Benzylamine (butyl mercaptan). | 1 | p-Nitrophenyl isocyanate. | p-Nitrocarbanilate of 2-hydroxyimino-2-butylsulfinyl-N-benzylacetamide. |
| Hexamethylene imine (cyclohexyl mercaptan). | 1 | 2-methoxyphenyl isocyanate. | 2-methoxycarbanilate of 2-hydroxyimino-2-cyclohexylsulfinyl-N,N-hexamethyleneacetamide. |
| N-methylbutylamine (3-cyclopentenyl mercaptan). | 1 | Benzyl isocyanate | Benzylcarbamate of 2-hydroxyimino-2-(3-cyclopentylsulfinyl)-N-methyl-N-butylacetamide. |
| Diethylamine (t-butyl mercaptan). | 1 | Octyl isocyanate | Actylcarbamate of 2-hydroxyimino-2-t-butylsulfinyl-N,N-diethylacetamide. |
| Piperidine (ethyl 2-mercaptoacetate). | 1 | Allyl isocyanate | Allylcarbamate of 2-hydroxyimino-2-[(2-ethoxy-2-oxoethyl)-sulfinyl]-N,N-pentamethyleneacetamide. |
| Dimethylamine (octyl mercaptan). | 1 | Propargyl isocyanate | Propargylcarbamate of 2-hydroxyimino-2-octylsulfinyl-N,N-dimethylacetamide. |
| Morpholine (methyl mercaptan). | 1 | 3,5-dinitrophenyl isocyanate. | 3,5-dinitrocarbanilate of 2-hydroxyimino-2-methylsulfinyl-N,N-(3-oxapentamethylene)-acetamide. |

TABLE II—Continued

| Amine (mercaptan) | Number moles of oxidant | Isocyanate | Product |
|---|---|---|---|
| Aniline (methyl mercaptan) | 1 | Phenyl isocyanate | Carbanilate of 2-hydroxyimino-2-methylsulfinyl-N-phenylacetamide. |
| Didodecylamine (ethyl mercaptan) | 1 | 3-nitro-4-chlorophenyl isocyanate | 3-nitro-4-chlorocarbanilate of 2-hydroxyimino-2-ethylsulfinyl-N,N-didodecylacetamide. |
| Benzylamine (butyl mercaptan) | 1 | 3-butenyl isocyanate | 3-butenylcarbamate of 2-hydroxyimino-2-butylsulfinyl-N-benzylacetamide. |
| Hexamethylene imine (cyclohexyl mercaptan) | 1 | Cyclooctyl isocyanate | Cyclooctylcarbamate of 2-hydroxyimino-2-cyclohexylsulfinyl-N,N-hexamethyleneacetamide. |
| Pyrrolidine (cyclopentyl mercaptan) | 1 | Methyl isocyanate | Methylcarbamate of 2-hydroxyimino-2-cyclopentylsulfinyl-N,N,tetramethyleneacetamide. |
| Diallylamine (4-chlorooctadecyl mercaptan) | 1 | ...do... | Methylcarbamate of 2-hydroxyimino.2.(4-chlorooctadecylsulfinyl)-N,N-diallylacetamide. |
| Dimethylamine (hexyl 2-mercaptoacetate) | 1 | Isopropyl isocyanate | Isopropylcarbamate of 2-hydroxyimino-2-[2-hexoxy-2-oxoethyl)-sulfinyl]-N,N-dimethylacetamide. |
| Cyclopropylamine (octadecyl mercaptan) | 1 | ...do... | Isopropylcarbamate of 2-hydroxyimino-2-octadecylsulfinyl-N-cyclopropylacetamide. |
| t-Butylamine (t-butyl mercaptan) | 1 | Ethyl isocyanate | Ethylcarbamate of 2-hydroxyimino-2-t-butylsulfinyl-N-t-butylacetamide. |
| Dodecylamine (methyl mercaptan) | 1 | ...do... | Ethylcarbamate of 2-hydroxyimino-2-methylsulfinyl-N-dodecylacetamide. |
| Hexamethyleneimine (methyl mercaptan) | 1 | Methyl isocyanate | Methylcarbamate of 2-hydroxyimino-2-methylsulfinyl-N,N-hexamethyleneacetamide. |
| Piperidine (isopropyl mercaptan) | 1 | ...do... | Methylcarbamate of 2-hydroxyimino-2-isopropylsulfinyl-N,N-pentamethyleneacetamide. |
| Pyrrolidine (cyclopentyl mercaptan) | 1 | Cyclohexyl isocyanate | Cyclohexylcarbamate of 2-hydroxyimino-2-cyclopentysulfinyl-N,N-tetramethyleneacetamide. |
| Diallylamine (4-chlorooctadecyl mercaptan) | 1 | Phenyl isocyanate | Carbanilate of 2-hydroxyimino-2-(4-chlorooctadecylsulfinyl)-N,N-diallylacetamide. |
| Dimethylamine (hexyl 2-mercaptoacetate) | 1 | p-Fluorophenyl isocyanate | p-Fluorocarbanilate of 2-hydroxyimino-2-[2-hexoxy-2-oxoethyl)-sulfinyl]-N,N-dimethylacetamide. |
| Cyclopropylamine (octadecyl mercaptan) | 1 | 2-methylphenyl isocyanate | 2-methylcarbanilate of 2-hydroxyimino-2-octadecylsulfinyl-N-cyclopropylacetamide. |
| t-Butylamine (t-butyl mercaptan) | 1 | Heptyl isocyanate | Heptylcarbamate of 2-hydroxyimino-2-t-butylsulfinyl-N-t-butylacetamide. |
| Dodecylamine (methyl mercaptan) | 1 | Phenyl isocyanate | Carbanilate of 2-hydroxyimino-2-methylsulfinyl-N-dodecylacetamide. |
| Hexamethyleneimine (methyl mercaptan) | 1 | m-Nitrophenyl isocyanate | m-Nitrocarbanilate of 2-hydroxyimino-2-methylsulfinyl-N,N-hexamethyleneacetamide. |
| Piperidine (isopropyl mercaptan) | 1 | p-Bromophenyl isocyanate | p-Bromocarbanilate of 2-hydroxyimino-2-isopropylsulfinyl-N,N-pentamethyleneacetamide. |
| Pyrrolidine (cyclopentyl mercaptan) | 1 | Octyl isocyanate | Octylcarbamate of 2-hydroxyimino-2-cyclopentylsulfinyl-N,N-tetramethyleneacetamide. |
| Diallylamine (4-chlorooctadecyl mercaptan) | 1 | Allyl isocyanate | Allylcarbamate of 2-hydroxyimino-2-(4-chlorooctadecylsulfinyl)-N,N-diallylacetamide. |
| Dimethylamine (hexyl 2-mercaptoacetate) | 1 | Propargyl isocyanate | Propargylcarbamate of 2-hydroxyimino-2-[2-hexoxy-2-oxoethyl)-sulfinyl]-N,N-dimethylacetamide. |
| Cyclopropylamine (decyl mercaptan) | 1 | 3,5-dinitrophenyl isocyanate | 3,5-dinitrocarbanilate of 2-hydroxyimino-2-decylsulfinyl-N-cyclopropylacetamide. |
| t-Butylamine (t-butyl mercaptan) | 1 | Phenyl isocyanate | Carbanilate of 2-hydroxyimino-2-t-butylsulfinyl-N-t-butylacetamide. |
| Dodecylamine (methyl mercaptan) | 1 | 3-nitro-4-bromophenyl isocyanate | 3-nitro-4-bromocarbanilate of 2-hydroxyimino-2-methylsulfinyl-N-dodecylacetamide. |
| Hexamethyleneimine (isopropyl mercaptan) | 1 | 3-butenyl isocyanate | 3-butenylcarbamate of 2-hydroxyimino-2-methylsulfinyl-N,N-hexamethyleneacetamide. |
| Piperidine (isopropyl mercaptan) | 1 | Cycloheptyl isocyanate | Cycloheptylcarbamate of 2-hydroxyimino-2-isopropylsulfinyl-N,N-pentamethyleneacetamide. |
| Dimethylamine (decyl mercaptan) | 2 | Ethyl isocyanate | Ethylcarbamate of 2-hydroxyimino-2-decyslulfonyl-N,N-dimethylacetamide. |
| Dimethylamine (3-chloropropyl mercaptan) | 2 | ...do... | Ethylcarbamate of 2-hydroxyimino-2-(3-chloropropylsulfonyl)-N,N-dimethylacetamide. |
| Diisopropylamine (decyl mercaptan) | 2 | ...do... | Ethylcarbamate of 2-hydroxyimino-2-decylsulfonyl-N,N-diisopropylacetamide. |
| Dimethylamine (methyl-2-mercaptoacetate) | 2 | Propyl isocyanate | Propylcarbamate of 2-hydroxyimino-2-[(2-methoxy-2-oxoethyl)-sulfonyl]-N,N-dimethylacetamide. |
| Cyclohexamethylamine (ethyl-2-mercaptoacetate) | 2 | ...do... | Propylcarbamate of 2-hydroxyimino-2-[(2-ethoxy-2-oxoethyl)-sulfonyl]-N-(cyclohexylmethyl)acetamide. |
| Cyclopentamethylamine (cyclohexyl mercaptan) | 2 | Allyl isocyanate | Allylcarbamate of 2-hydroxyimino-2-cyclohexylsulfonyl-N-(cyclopentylmethyl)-acetamide. |
| Dodecylamine (methyl mercaptan) | 2 | Butyl isocyanate | Butylcarbamate of 2-hydroxyimino-2-methylfulfonyl-N-dodecylacetamide. |
| Hexamethyleneimine (t-butyl mercaptan) | 2 | Methyl isocyanate | Methylcarbamate of 2-hydroxyimino-2-(t-butylsulfonyl)-N,N-hexaethyleneacetamide. |
| Benzylamine (benzyl mercaptan) | 2 | ...do... | Methylcarbamate of 2-hydroxyimino-2-benzylsulfonyl-N-benzylacetamide. |
| Dimethylamine (dodecyl mercaptan) | 2 | 3,4 dichlorophenyl isocyanate | 3,4-dichlorocarbanilate of 2-hydroxyimino-2-dodecylsulfonyl-N,Ndi-mro-methylacetamide. |
| Dimethylamine (3 chloropropyl) | 2 | Cyclopentyl isocyanate | Cyclopentylcarbamate of 2-hydroxyimino-2-(3-chloropropylsufonyl)N,N-dimethylacetamide. |
| Diisopropylamine (decyl mercaptan) | 2 | Phenyl isocyanate | Carbanilate of 2-hydroxyimino-2-decylsulfonyl-N,N-diisopropylacetamide. |
| Dimethylamine (methyl 2 mercaptoacetate) | 2 | ...do... | Carbanilate of 2-hydroxyimino-2-[(2-methoxy-2-oxoethyl)-sulfonyl]-N,N-dimethylacetamide. |
| Cyclohexanemethylamine (ethyl 2-mercaptoacetate) | 2 | ...do... | Carbanilate of 2-hydroxyimino-2-[(2-ethoxy-2-oxoethyl)-sulfonyl]-N-(cyclohexylmethyl)acetamide. |
| Cyclopentanemethylamine (cyclohexyl mercaptan) | 2 | p-Nitrophenyl isocyanate | p-Nitrocarbanilate of 2-hydroxyimino-2-cyclohexylsulfonyl-N-(cyclopentylmethyl)-acetamide. |
| Dodecylamine (methyl mercaptan) | 2 | Octyl isocyanate | Octylcarbamate of 2-hydroxyimino-2-methylsulfonyl-N dodecylacetamide. |
| Hexamethyleneimine (t butyl mercaptan) | 2 | 3,4 dimethoxyphenyl isocyanate | 3,4-dimethoxycarbanilate of 2-hydroxyimino-2-(t-butylsulfonyl)-N,N-hexamethyleneacetamide. |
| Benzylamine (benzyl mercaptan) | 2 | 2 methoxyphenyl isocyanate | 2-methoxycarbanilate of 2-hydroxyimino-2-benzylsulfonyl-N-benzylacetamide. |
| Dimethylamine (decyl mercaptan) | 2 | Benzyl isocyanate | Benzylcarbamate of 2-hydroxyimino-2-decylsulfonyl-N,N-dimethylacetamide. |
| Dimethylamine (3 chloropropyl mercaptan) | 2 | Octyl isocyanate | Octylcarbamate of 2-hydroxyimino-2(3-chloropropylsulfonyl)-N,N-dimethylacetamide. |
| Diisopropylamine (decyl mercaptan) | 2 | Allyl isocyanate | Allylcarbamate of 2-hydroxyimino-2-decylsulfonyl-N,N-diisopropylacetamide. |
| Dimethylamine (methyl 2 mercaptoacetate) | 2 | Propargyl isocyanate | Propargylcarbamate of 2-hydroxyimino-2-[(2-methoxy-2-oxoethyl)-sulfonyl]-N,N-dimethylacetamide. |
| Cyclohexanemethylamine (ethyl-2-mercaptoacetate) | 2 | 3,5-dinitrophenyl isocyanate | 3,5-dinitrocarbanilate of 2-hydroxyimino-2-[(2-ethoxy-2-oxoethyl)-sulfonyl]-N-(cyclohexylmethyl)acetamide. |
| Cyclopentanemethylamine (cyclohexyl mercaptan) | 2 | Phenyl isocyanate | Carbanilate of 2-hydroxyimino-2-cyclohexylsulfonyl-N-(cyclopentylmethyl)-acetamide. |
| Didodecylamine (methyl mercaptan) | 2 | 3-nitro-4-chlorophenyl isocyanate | 3-nitro-4-chlorocarbanilate of 2-hydroxyimino-2-methylsulfonyl-N-didodecylacetamide. |
| Hexamethyleneimine (t-butyl mercaptan) | 2 | 3-butenyl isocyanate | 3-butenylcarbamate of 2-hydroxyimino-2-(t-butylsulfonyl)-N,N-hexamethyleneacetamide. |
| Benzylamine -benzyl mercaptan | 2 | Cyclooctyl isocyanate | Cyclooctylcarbamate of 2-hydroxyimino-2-benzylsulfonyl-N-benzylacetamide. |

TABLE II—Continued

| Amine (mercaptan) | Number moles of oxidant | Isocyanate | Product |
|---|---|---|---|
| Aniline (hexyl mercaptan) | 2 | Ethyl isocyanate | Ethylcarbamate of 2-hydroxyimino-2-hexylsulfonyl-N-phenylacetamide |
| Morpholine (allyl mercaptan) | 2 | Methyl isocyanate | Methylcarbamate of 2-hydroxyimino-2-allylsulfonyl-N,N-(3-oxapentamethyleneacetamide. |
| t-Butylamine (3-cyclopentenyl mercaptan). | 2 | Isopropyl isocyanate | Isopropylcarbamate of 2-hydroxyimino-2-(3-cyclopentenylsulfonyl)-N-t-butylacetamide. |
| Allylamine (cyclohexanemethyl mercaptan). | 2 | ...do... | Isopropylcarbamate of 2-hydroxyimino-2-(cyclohexylmethylsulfonyl)-N-allylacetamide. |
| Diethylamine (ethyl mercaptan) | 2 | ...do... | Isopropylcarbamate of 2-hydroxyimino-2-ethylsulfonyl-N,N-diethylacetamide. |
| N-methylbutylamine (phenyl mercaptan). | 2 | Methyl isocyanate | Methylcarbamate of 2-hydroxyimino-2-phenylsulfonyl-N-methyl-N-butylacetamide. |
| Dipropylamine (phenyl mercaptan). | 2 | ...do... | Methylcarbamate of 2-hydroxyimino-2-phenylsulfonyl-N,N-dipropylacetamide. |
| Dipropylamine (methyl mercaptan). | 2 | ...do... | Methylcarbamate of 2-hydroxyimino-2-methylsulfonyl-N,N-dipropylacetamide. |
| Dipropylamine (t-butyl mercaptan). | 2 | ...do... | Methylcarbamate of 2-hydroxyimino-2-t-butylsulfonyl-N,N-dipropylacetamide. |
| Aniline (hexyl mercaptan) | 2 | 3,4-dichlorophenyl isocyanate. | 3,4-dichlorocarbanilate of 2-hydroxyimino-2-hexylsulfonyl-N-phenylacetamide. |
| Morpholine (allyl mercaptan) | 2 | Cyclohexyl isocyanate | Cyclohexylcarbamate of 2-hydroxyimino-2-allylsulfonyl-N,N-(3-oxapentamethyleneacetamide. |
| t-Butylamine (3-cyclopentenyl mercaptan). | 2 | Phenyl isocyanate | Carbanilate of 2-hydroxyimino-2-(3-cyclopentenylsulfonyl)-N-t-butylacetamide. |
| Allylamine (cyclohexanemethyl mercaptan). | 2 | p-Fluorophenyl isocyanate. | p-Fluorocarbanilate of 2-hydroxyimino-2-cyclohexylmethylsulfonyl)-N-allylacetamide. |
| Diethylamine (ethyl mercaptan) | 2 | 3-methylphenyl isocyanate. | 3-methylcarbanilate of 2-hydroxyimino-2-ethylsulfonyl-N,N-diethylacetamide. |
| N-methylbutylamine (phenyl mercaptan). | 2 | Hexyl isocyanate | Hexylcarbamate of 2-hydroxyimino-2-phenylsulfonyl-N-methyl-N-butylacetamide. |
| Dipropylamine (phenyl mercaptan). | 2 | Phenyl isocyanate | Carbanilate of 2-hydroxyimino-2-phenylsulfonyl-N,N-dipropylacetamide. |
| Dipropylamine (methyl mercaptan). | 2 | p-Nitrophenyl isocyanate. | p-Nitrocarbanilate of 2-hydroxyimino-2-methylsulfonyl-N,N-dipropylacetamide. |
| Dipropylamine (t-butyl mercaptan). | 2 | 2-methoxyphenyl isocyanate. | 2-methoxycarbanilate of 2-hydroxyimino-2-t-butylsulfonyl-N,N-dipropylacetamide. |
| Aniline (hexyl mercaptan) | 2 | Benzyl isocyanate | Benzylcarbamate of 2-hydroxyimino-2-hexylsulfonyl-N-phenylacetamide. |
| Morpholine (allyl mercaptan) | 2 | Octyl isocyanate | Octylcarbamate of 2-hydroxyimino-2-allylsulfonyl-N,N-(3-oxapentamethyleneacetamide. |
| t-Butylamine (3-cyclopentenyl mercaptan). | 2 | Allyl isocyanate | Allylcarbamate of 2-hydroxyimino-2-(3-cyclopentenylsulfonyl)-N-t-butylacetamide. |
| Allylamine (cyclohexanemethyl mercaptan). | 2 | Propargyl isocyanate | Propargylcarbamate of 2-hydroxyimino-2-cyclohexylmethylsulfonyl)-N-allylacetamide. |
| Diethylamine (ethyl mercaptan) | 2 | 3,5-dinitrophenyl isocyanate. | 3,5-dinitrocarbanilate of 2-hydroxyimino-2-ethylsulfonyl-N,N-diethylacetamide. |
| N-methylbutylamine (phenyl mercaptan). | 2 | Phenyl isocyanate | Carbanilate of 2-hydroxyimino-2-phenylsulfonyl-N-methyl-N-butylacetamide. |
| Dipropylamine (phenyl mercaptan). | 2 | 3-nitro-4-chlorophenyl isocyanate. | 3-nitro-4-chlorocarbanilate of 2-hydroxyimino-2-phenylsulfonyl-N,N-dipropylacetamide. |
| Dipropylamine (methyl mercaptan). | 2 | 3-butenyl isocyanate | 3-butenylcarbamate of 2-hydroxyimino-2-methylsulfonyl-N,N-dipropylacetamide. |
| Dipropylamine (t-butyl mercaptan). | 2 | Cyclooctyl isocyanate | Cyclooctylcarbamate of 2-hydroxyimino-2-t-butylsulfonyl-N,N-dipropylacetamide. |
| Piperidine (cyclohexyl mercaptan) | 2 | Ethyl isocyanate | Ethylcarbamate of 2-hydroxyimino-2-cyclohexylsulfonyl-N,N-pentamethyleneacetamide. |
| Piperidine (octadecyl mercaptan) | 2 | Methyl isocyanate | Methylcarbamate of 2-hydroxyimino-2-octadecylsulfonyl-N,N-pentamethyleneacetamide. |
| Aziridine (allyl mercaptan) | 2 | ...do... | Methylcarbamate of 2-hydroxyimino-2-allylsulfonyl-N,N-dimethyleneacetamide. |
| Aziridine (3-chloropropyl mercaptan). | 2 | Isopropyl isocyanate | Isopropylcarbamate of 2-hydroxyimino-2-(3-chloropropylsulfonyl)-N,N-dimethyleneacetamide. |
| Cyclooctylamine (methyl mercaptan). | 2 | ...do... | Isopropylcarbamate of 2-hydroxyimino-2-methylsulfonyl-N-cyclooctylacetamide. |
| 2-cyclooctenylamine (decyl mercaptan). | 2 | Methyl isocyanate | Methylcarbamate of 2-hydroxyimino-2-decylsulfonyl-N-(2-cyclooctenyl)-acetamide. |
| 2-butenylamine (methyl mercaptan). | 2 | ...do... | Methylcarbamate of 2-hydroxyimino-2-methylsulfonyl-N-(2-butenyl)-acetamide. |
| 2-cyclopentenylamine (cyclohexyl mercaptan). | 2 | ...do... | Methylcarbamate of 2-hydroxyimino-2-cyclohexylsulfonyl-N-(2-cyclopentenyl)-acetamide. |
| Piperidine (cyclohexyl mercaptan) | 2 | 3,4-dichlorophenyl isocyanate. | 3-4-dichlorocarbanilate of 2-hydroxyimino-2-cyclohexylsulfonyl-N,N-pentamethyleneacetamide. |
| Piperidine (decyl mercaptan) | 2 | Cyclohexyl isocyanate | Cyclohexylcarbamate of 2-hydroxyimino-2-decylsulfonyl-N,N-pentamethyleneacetamide. |
| Aziridine (allyl mercaptan) | 2 | Phenyl isocyanate | Carbanilate of 2-hydroxyimino-2-allylsulfonyl-N,N-dimethyleneacetamide. |
| Aziridine (3-chloropropyl mercaptan). | 2 | p-Fluorophenyl isocyanate. | p-Fluorocarbanilate of 2-hydroxyimino-2-(3-chloropropylsulfonyl)-N,N-dimethyleneacetamide. |
| Cyclooctylamine (methyl mercaptan). | 2 | 1-methylphenyl isocyanate. | 1-methylcarbanilate of 2-hydroxyimino-2-methylsulfonyl-N-cyclooctylacetamide. |
| 2-cyclooctenylamine (decyl mercaptan). | 2 | Hexyl isocyanate | Hexylcarbamate of 2-hydroxyimino-2-decylsulfonyl-N-(2-cyclooctenyl)-acetamide. |
| 2-butenylamine (methyl mercaptan). | 2 | p-Nitrophenyl isocyanate. | p-Nitrocarbanilate of 2-hydroxyimino-2-methylsulfonyl-N-(2-butenyl)-acetamide. |
| 2-cyclopentenylamine (cyclohexyl mercaptan). | 2 | 2-methoxyphenyl isocyanate. | 2-methoxycarbanilate of 2-hydroxyimino-2-cyclohexylsulfonyl-N-(2-cyclopentenyl)-acetamide. |
| Piperidine (cyclohexyl mercaptan) | 2 | Benzyl isocyanate | Benzylcarbamate of 2-hydroxyimino-2-cyclohexylsulfonyl-N,N-pentamethyleneacetamide. |
| Piperidine (dodecyl mercaptan) | 2 | Octyl isocyanate | Octylcarbamate of 2-hydroxyimino-2-dodecylsulfonyl-N,N-pentamethyleneacetamide. |
| Aziridine (allyl mercaptan) | 2 | Allyl isocyanate | Allylcarbamate of 2-hydroxyimino-2-allylsulfonyl-N,N-dimethyleneacetamide. |
| Aziridine (3-chloropropyl mercaptan). | 2 | Propargyl isocyanate | Propargylcarbamate of 2-hydroxyimino-2-(3-chloropropylsulfonyl)-N,N-dimethyleneacetamide. |
| Cyclooctylamine (methyl mercaptan). | 2 | 3,5-dinitrophenyl isocyanate. | 3,5-dinitrocarbanilate of 2-hydroxyimino-2-methylsulfonyl-N-cyclooctylacetamide. |
| 2-cyclooctenylamine (decyl mercaptan). | 2 | Phenyl isocyanate | Carbanilate of 2-hydroxyimino-2-decylsulfonyl-N-(2-cyclooctenyl)-acetamide. |
| 2-butenylamine (methyl mercaptan). | 2 | 3-butenyl isocyanate | 3-butenylcarbamate of 2-hydroxyimino-2-methylsulfonyl-N-(2-butenyl)-acetamide. |
| 2-cyclopentenylamine (cyclohexyl mercaptan). | 2 | Cyclooctyl isocyanate | Cyclooctylcarbamate of 2-hydroxyimino-2-cyclohexylsulfonyl-N-(2-cyclopentenyl)-acetamide. |

EXAMPLE 19

Preparation of the methoxyacetate of 2-hydroxyimino-2-methylsulfonyl-N,N-dimethylacetamide To a mixture of 4.0 parts of 2-hydroxyimino-2-methylsulfonyl-N,N-dimethylacetamide (see Example 1), 1.74 parts of pyridine, and 38.4 parts of acetonitrile which has been cooled to −5° to +5°, is added dropwise 2.39 parts of methoxyacetyl chloride over a 30 minute period. The cooling bath is then removed and the reaction is allowed to stir until the temperature rises to approximately 15°. The reaction mixture is filtered and the collected solids recrystallized from acetonitrile/isopropanol, 5/1, yielding 3.5 parts of the methoxyacetate of 2-hydroxyimino-2-methylsulfonyl-N,N-dimethylacetamide, M.P. 140–140.5°.

EXAMPLE 20

Preparation of the chloroacetate of 2-hydroxyimino-2-methylsulfonyl-N,N-dimethylacetamide Replacing the methoxyacetyl chloride of Example 19 with an equivalent amount of the chloroacetyl chloride there is obtained the chloroacetate of 2-hydroxyimino-2-methylsulfonyl-N,N-dimethylacetamide, which is recrystallized from acetonitrile/isopropanol, 10/1, M.P. 165–166.5°.

EXAMPLE 21

Preparation of the mono-(2-chloroethyl) carbonate of 2-hydroxyimino-2-methylsulfonyl-N,N-dimethylacetamide Replacing the methoxyacetyl chloride of Example 19 with an equivalent amount of 2 - chloroethyl chloroformate, there is obtained the mono-(2-chloroethyl) carbonate of 2-hydroxyimino - 2 - methylsulfonyl-N,N-dimethylacetamide, which is recrystallized from isopropanol, M.P. 98.5°.

EXAMPLE 22

Preparation of the methyl carbonate of 2-hydroxyimino-2-methylsulfonyl-N,N-dimethylacetamide Replacing the methoxyacetyl chloride of Example 19 with an equivalent amount of methyl chloroformate, there is obtained the methyl carbonate of 2-hydroxyimino-2-methylsulfonyl - N,N, - dimethylacetamide, which is crystallized from acetonitrile, M.P. 151.5°.

EXAMPLE 23

Preparation of the methoxyacetate of 2-hydroxyimino-2-octylsulfonyl-N,N-diethylacetamide Replacing the starting material of Example 19 with an equivalent amount of 2-hydroxyimino-2-octylsulfonyl-N,n-diethylacetamide, there is obtained the methoxyacetate of 2-hydroxyimino-2-octylsulfonyl-N,N-diethylacetamide, $N_D^{25}=1.4822$.

EXAMPLE 24

Preparation of the 5-norbornene-2-carboxylate of 2-hydroxyimino-2-methylsulfonyl-N,N-dimethylacetamide Replacing the methoxyacetyl chloride of Example 19 with an equivalent amount of 5-norborene-2-carbonyl chloride, there is obtained the 5-norborene-2-carboxylate of 2 - hydroxyimino - 2 - methylsulfonyl - N,N - dimethylacetamide, which is recrystallized from isopropanol, M.P. 131.5–132.5°.

The compounds listed under the heading "Product" in Table III are prepared by the procedure illustrated in Example 19, using the products of Table I as starting materials.

TABLE III

| Starting material | Acid chloride | Product |
|---|---|---|
| 2-hydroxyimino-2-dodecylsulfonyl-N,N-dimethylacetamide. | Acetyl chloride | Acetate of 2-hydroxyimino-2-dodecylsulfonyl-N,N-dimethylacetamide. |
| 2-hydroxyimino-2-(3-chloropropylsulfonyl)-N,N-dimethylacetamide. | Acryloyl chloride | Acrylate of 2-hydroxyimino-2-(3-chloropropylsulfonyl)-N,N-dimethylacetamide. |
| 2-hydroxyimino-2-decylsulfonyl-N,N-diisopropylacetamide. | Chloroacetyl chloride | Chloroacetate of 2-hydroxyimino-2-decylsulfonyl-N,N-diisopropylacetamide. |
| 2-hydroxyimino-2-[(2-methoxy-2-oxoethyl)-sulfonyl]-N,N-dimethylacetamide. | 2-hexenoyl chloride | 2-hexenoate of 2-hydroxyimino-2-[(2-methoxy-2-oxoethyl)-sulfonyl]-N,N-dimethylacetamide. |
| 2-hydroxyimino-2-[(2-ethoxy-2-oxoethyl)-sulfonyl]-N-(cyclohexylmethyl)-acetamide. | Methoxyacetyl chloride. | Methoxyacetate of 2-hydroxyimino-2-[(2-ethoxy-2-oxoethyl)-sulfonyl]-N-(cyclohexylmethyl)acetamide. |
| 2-hydroxyimino-2-cyclohexylsulfonyl-N-(cyclopentylmethyl)acetamide. | Trichloroacetyl chloride. | Trichloroacetate of 2-hydroxyimino-2-cyclohexylsulfonyl-N-(cyclopentylmethyl)acetamide. |
| 2-hydroxyimino-2-methylsulfonyl-N-dodecylacetamide. | Diethoxyacetyl chloride. | Diethoxyacetate of 2-hydroxyimino-2-methylsulfonyl-N-dodecylacetamide. |
| 2-hydroxyimino-2-(t-butylsulfonyl)-N,N-hexamethyleneacetamide. | Phenylacetyl chloride. | 2-hydroxyimino-2-(t-butylsulfonyl)-N,N-hexamethyleneacetamide. |
| 2-hydroxyimino-2-benzylsulfonyl-N-benzylacetamide. | Propionyl chloride | Propionate of 2-hydroxyimino-2-benzylsulfonyl-N-benzylacetamide. |
| 2-hydroxyimino-2-decylsulfonyl-N,N-dimethylacetamide. | Dichloroacetyl chloride. | Dichloroacetate of 2-hydroxyimino-2-decylsulfonyl-N,N-dimethylacetamide. |
| 2-hydroxyimino-2-(3-chloropropylsulfonyl)-N,N-dimethylacetamide. | Butyryl chloride | Butyrate of 2-hydroxyimino-2-(3,chloropropylsulfonyl)-N,N-dimethylacetamide. |
| 2-hydroxyimino-2-decylsulfonyl-N,N-diisopropylacetamide | 3-chlorovaleryl chloride. | 3-chlorovalerate of 2-hydroxyimino-2-decylsulfonyl-N,N-diisopropylacetamide. |
| 2-hydroxyimino-2-[(2-methoxy-2-oxoethyl)-sulfonyl]-N,N-dimethylacetamide. | 12-methoxydodecanoyl chloride. | 12-methoxydodecanoate of 2-hydroxyimino-2-[(2-methoxy-2-oxoethyl)-sulfonyl]-N,N-dimethylacetamide. |
| 2-hydroxyimino-2-[(2-ethoxy-2-oxoethyl)-sulfonyl]-N-(cyclohexylmethyl)acetamide. | β-ethoxypropionyl chloride. | β-ethoxypropionate of 2-hydroxyimino-2-[(2-ethoxy-2-oxoethyl)-sulfonyl]-N-(cyclohexylmethyl)acetamide. |
| 2-hydroxyimino-2-cyclohexylsulfonyl-N-(cyclopentylmethyl)acetamide. | 6-chlorodecanoyl chloride. | 6-chlorodecanoyl of 2-hydroxyimino-2-cyclohexylsulfonyl-N-(cyclopentylmethyl)-acetamide. |
| 2-hydroxyimino-2-methylsulfonyl-N-decylacetamide. | 2-chlorooctanoyl chloride. | 2-chlorooctanoyl of 2-hydroxyimino-2-methylsulfonyl-N-decylacetamide. |
| 2-hydroxyimino-2-(t-butylsulfonyl)-N,N-hexamethyleneacetamide. | 2-norbornanecarbonyl chloride. | 2-norbornanecarboxylate of 2-hydroxyimino-2-(t-butylsulfonyl)-N,N-hexamethyleneacetamide. |
| 2-hydroxyimino-2-benzylsulfonyl-N-benzylacetamide. | 2-bicyclo[2.2.3]nonanecarbonyl chloride. | 2-bicyclo[2.2.3]nonanecarboxylate of 2-hydroxyimino-2-benzylsulfonyl-N-benzylacetamide. |
| 2-hydroxyimino-2-dodecylsulfonyl-N,N-dimethylacetamide. | 2-cyclobutenecarbonyl chloride. | 2-cyclobutenecarboxylate of 2-hydroxyimino-2-dodecylsulfonyl-N,N-dimethylacetamide. |
| 2-hydroxyimino-2](2-methoxy-2-oxoethyl)-sulfonyl]-N,N-dimethyl-acetamide. | 5-cyclododecenecarbonyl chloride. | 5-cyclododecenecarboxylate of 2-hydroxyimino-2-](2-methoxy-2-oxoethyl)-sulfonyl)-N,N-dimethylacetamide. |
| 2-hydroxyimino-2-](2-ethoxy-2-oxoethyl)-sulfonyl]-N-(cyclohexyl-methyl)acetamide. | Cyclopropylacetyl chloride. | Cycloperoxylactate of 2-hydroxyimino-2-](2-ethoxy-2-oxoethyl)-sulfonyl]-N-(cyclohexylmethyl)acetamide. |
| 2-hydroxyimino-2-cyclohexylsulfonyl-N-(cyclopentylmethyl)acetamide. | 2-octahydronaphthenecarbonyl chloride. | 2-octahydronaphthenecarboxylate of 2-hydroxyimino-2-cyclohexylsulfonyl-N-(cyclopentylmethyl)acetamide. |
| 2-hydroxyimino-2-methylsulfonyl-N-didodecylacetamide. | 3-cyclohexenecarbonyl chloride. | 3-cyclohexenecarboxylate of 2-hydroxyimino-2-methylsulfonyl-N-didodecylacetamide. |
| 2-hydroxyimino-2-(t-butylsulfonyl)-N,N-hexamethylene-acetamide. | 2-cyclobutenecarbonyl chloride. | 2-cyclobutenecarboxylate of 2-hydroxyimino-2-(t-butylsulfonyl)-N,N-hexamethyleneacetamide. |
| 2-hydroxyimino-2-benzylsulfonyl-N-benzylacetamide. | 3-cyclodecenecarbonyl chloride. | 3-cyclodecenecarboxylate of 2-hydroxyimino-2-benzylsulfonyl-N-benzylacetamide. |
| 2-hydroxyimino-2-hexylsulfonyl-N-phenylacetamide. | 3-cyclopentenecarbonyl chloride. | 3-cyclopentenecarboxylate of 2-hydroxyimino-2-hexylsulfonyl-N-phenylacetamide. |

TABLE III—Continued

| Starting material | Acid chloride | Product |
|---|---|---|
| 2-hydroxyimino-2-allylsulfonyl-N,N-(3-oxapentamethylene)acetamide. | Heptanoyl chloride. | Heptanoate of 2-hydroxyimino-2-allylsulfonyl-N,N-(3-oxapentamethylene)acetamide. |
| 2-hydroxyimino-2-(3-cyclopentenylsulfonyl)-N-t-butylacetamide. | Isobutanoyl chloride. | Isobutanoate of 2-hydroxyimino-2-(3-cyclopentenysulfonyl)-N-t-butylacetamide. |
| 2-hydroxyimino-2-cyclohexylmethylsulfonyl)-N-allylacetamide. | Phenylacetyl chloride. | Phenylacetate of 2-hydroxyimino-2-cyclohexylmethylsulfonyl)-N-allylacetamide. |
| 2-hydroxyimino-2-ethylsulfonyl-N,N-diethylacetamide. | 5-norbornene-2-carbonyl chloride. | 5-norbornene-2-carboxylate of 2-hydroxyimino-2-ethylsulfonyl-N,N-diethylacetamide. |
| 2-hydroxyimino-2-phenylsulfonyl-N-methyl-N-butylacetamide. | Cyclodecaneacetyl chloride. | Cyclodecaneacetate of 2-hydroxyimino-2-phenylsulfonyl-N-methyl-N-butylacetamide. |
| 2-hydroxyimino-2-phenylsulfonyl-N,N-dipropylacetamide. | Methyl chloroformate. | Methyl carbamate of 2-hydroxyimino-2-phenylsulfonyl-N,N-dipropylacetamide. |
| 2-hydroxyimino-2-methylsulfonyl-N,N-dipropylacetamide. | Butyl chloroformate. | Butyl carbamate of 2-hydroxyimino-2-methylsulfonyl-N,N-dipropylacetamide. |
| 2-hydroxyimino-2-t-2-butylsulfonyl-N,N-dipropylacetamide. | ...do... | Butyl carbamate of 2-hydroxyimino-2-t-butylsulfonyl-N,N-dipropylacetamide. |
| 2-hydroxyimino-2-hexylsulfonyl-N-phenylacetamide. | Propyl chloroformate. | Propyl carbonate of 2-hydroxyimino-2-hexylsulfonyl-N-phenylacetamide. |
| 2-hydroxyimino-2-allylsulfonyl-N,N-(3-oxapentamethylene)acetamide. | 2-chloroethyl chloroformate. | 2-chloroethyl carbonate of 2-hydroxyimino-2-allylsulfonyl-N,N-(3-oxapentamethylene)acetamide. |
| 2-hydroxyimino-2-(3-cyclopentenylsulfonyl)-N-t-butylacetamide. | 2-methoxymethyl chloroformate. | 2-methoxymethyl of 2-hydroxyimino-2-(3-cyclopentenylsulfonyl)-N-t-butylacetamide. |
| 2-hydroxyimino-2-(cyclohexymethylsulfonyl)-N-allylacetamide. | 1-bromoethyl chloroformate. | 1-bromoethyl carbonate of 2-hydroxyimino-2-(cyclohexymethylsulfonyl)-N-allylacetamide. |
| 2-hydroxyimino-2-ethylsulfonyl-N,N-diethylacetamide. | 4-ethoxybutyl chloroformate. | 4-ethoxybutyl carbonate of 2-hydroxyimino-2-ethylsulfonyl-N,N-diethylacetamide. |
| 2-hydroxyimino-2-methylsulfonyl-N,N-diproxylacetamide. | Methyl chloroformate. | Methyl carbonate of 2-hydroxyimino-2-methylsulfonyl-N,N-dipropylacetamide. |
| 2-hydroxyimino-2-t-butylsulfonyl-N,N-diproxylacetamide. | ...do... | Methyl carbonate of 2-hydroxyimino-2-t-butylsulfonyl-N,N-dipropylacetamide. |
| 2-hydroxyimino-2-cyclohexylsulfonyl-N,N-pentamethyleneacetamide. | 4-bromobutyl chloroformate. | 4-bromobutyl carbonate of 2-hydroxyimino-2-cyclohexylsulfonyl-N,N-pentamethyleneacetamide. |
| 2-hydroxyimino-2-allylsulfonyl-N,N-dimethyleneacetamide. | Chloromethyl chloroformate. | Chloromethyl carbonate of 2-hydroxyimino-2-allylsulfonyl-N,N-dimethyleneacetamide. |
| 2-hydroxyimino-2-(3-chloropropylsulfonyl)-N,N-dimethyleneacetamide. | ...do... | Chloromethyl carbonate of 2-hydroxyimino-2-(3-chloropropylsulfonyl)-N,N-dimethyleneacetamide. |
| 2-hydroxyimino-2-methylsulfonyl-N-cyclooctylacetamide. | ...do... | Chloromethyl carbonate of 2-hydroxyimino-2-methylsulfonyl-N-cyclooctylacetamide. |
| 2-hydroxyimino-2-decylsulfonyl-N-(2-cyclooctenyl)acetamide. | Bromomethyl chloroformate. | Bromoethyl carbonate of 2-hydroxyimino-2-decylsulfonyl-N-(2-cyclooctenyl)-acetamide. |
| 2-hydroxyimino-2-methylsulfonyl-N-(2-butenyl)acetamide. | Chloroacetyl chloride. | Chloroacetate of 2-hydroxyimino-2-methylsulfonyl-N-(2-butenyl)-acetamide. |
| 2-hydroxyimino-2-cyclohexylsulfonyl-N-(2-cyclopentenyl)acetamide. | ...do... | Chloroacetate of 2-hydroxyimino-2-cyclohexylsulfonyl-N-(2-cyclopentenyl)acetamide. |
| 2-hydroxyimino-2-cyclohexylsulfonyl-N,N-pentamethyleneacetamide. | 3-cyclopentenecarbonyl chloride. | 3-cyclopentenecarboxylate of 2-hydroxyimino-2-cyclohexylsulfonyl-N,N-pentamethyleneacetamide. |
| 2-hydroxyimino-2-dodecylsulfonyl-N,N-pentamethyleneacetamide. | ...do... | 3-cyclopentenecarboxylate of 2-hydroxyimino-2-dodecylsulfonyl-N,N-pentamethyleneacetamide. |
| 2-hydroxyimino-2-allylsulfonyl-N,N-dimethyleneacetamide. | 5-norbornene-2-carbonyl chloride. | 5-norbornene-2-carboxylate of 2-hydroxyimino-2-allylsulfonyl-N,N-dimethyleneacetamide. |
| 2-hydroxyimino-2-(3-chloropropylsulfonyl)-N,N-dimethyleneacetamide. | 2-cyclobutenylacetyl chloride. | 2-cyclobutenylacetate of 2-hydroxyimino-2-(3-chloropropylsulfonyl)-N,N-dimethyleneacetamide. |
| 2-hydroxyimino-2-methylsulfonyl-N-cyclooctylacetamide. | 5-cyclodecenylacetyl chloride. | 5-cyclodeceneacetate of 2-hydroxyimino-2-methylsulfonyl-N-cyclooctylacetamide. |
| 2-hydroxyimino-2-decylsulfonyl-N-(2-cyclooctenyl)-acetamide. | Cyclooctanecarbonyl chloride. | Cyclooctanecarboxylate of 2-hydroxyimino-2-decylsulfonyl-N-(2-cyclooctenyl)acetamide. |
| 2-hydroxyimino-2-methylsulfonyl-N-(2-butenyl)-acetamide. | 12-chlorododecanoyl chloride. | 12-chlorododecanoate of 2-hydroxyimino-2-methylsulfonyl-N-(2-butenyl)acetamide. |
| 2-hydroxyimino-2-cyclohexylsulfonyl-N-(2-cyclopentenyl)acetamide. | 7,7-dimethoxyheptanoyl chloride. | 7,7-dimethoxyheptanoate of 2-hydroxyimino-2-cyclohexylsulfonyl-N-(2-cyclopentenyl)-acetamide. |
| 2-hydroxyimino-2-cyclopentylsulfinyl-N,N-tetramethyleneacetamide. | Adamantanecarbonyl chloride. | Adamantanecarboxylate of 2-hydroxyimino-2-cyclopentylsulfinyl-N,N-tetramethyleneacetamide. |
| 2-hydroxyimino-2-(4-chlorooctadecylsulfinyl)-N,N-diallylacetamide. | Hexahydroindanecarbonyl chloride. | Hexahydroindanecarboxylate of 2-hydroxyimino-2-(4-chlorooctadecylsulfinyl)-N,N-diallylacetamide. |
| 2-hydroxyimino-2-[(2-hexoxy-2-oxoethyl)sulfinyl]-N,N-dimethylacetamide. | Cycloheptanecarbonyl chloride. | Cycloheptanecarboxylate of 2-hydroxyimino-2-[(2-hexoxy-2-oxoethyl)-sulfinyl]-N,N-dimethylacetamide. |
| 2-hydroxyimino-2-decylsulfinyl-N-cyclopropylacetamide. | Decahydronaphthanecarbonyl chloride. | Decahydronaphthanecarboxylate of 2-hydroxyimino-2-decylsulfinyl-N-cyclopropylacetamide. |
| 2-hydroxyimino-2-t-butylsulfinyl-N-t-butylacetamide. | 2-indenecarbonyl chloride. | 2-indenecarboxylate of 2-hydroxyimino-2-t-butylsulfinyl-N,N-butylacetamide. |
| 2-hydroxyimino-2-methylsulfinyl-N-dodecylacetamide. | ...do... | 2-indenecarboxylate of 2-hydroxyimino-2-methylsulfinyl-N-dodecylacetamide. |
| 2-hydroxyimino-2-methylsulfinyl-N,N-hexamethyleneacetamide. | Decanoyl chloride. | Decanoate of 2-hydroxyimino-2-methylsulfonyl-N-,hexamethyleneacetamide. |
| 2-hydroxyimino-2-isopropylsulfinyl-N,N-pentamethyleneacetamide. | Dodecanoyl chloride. | Dodecanoate of 2-hydroxyimino-2-isopropylsulfonyl-N,N-pentamethyleneacetamide. |
| 2-hydroxyimino-2-cyclopentylsulfinyl-N,N-tetramethyleneacetamide. | Ethyl chloroformate. | Ethyl carbonate of 2-hydroxyimino-2-cyclopentylsulfinyl-N,N-tetramethyleneacetamide. |
| 2-hydroxyimino-2-(4-chlorooctadecylsulfinyl)-N,N-diallylacetamide. | ...do... | Ethyl carbonate of 2-hydroxyimino-2-(4-chlorooctadecylsulfinyl)-N,N-diallylacetamide. |
| 2-hydroxyimino-2-[(2-hexoxy-2-oxoethyl)-sulfinyl]-N,-N-dimethylacetamide. | 2-ethoxyethyl chloroformate. | 2-ethoxyethyl carbonate of 2-hydroxyimino-2-(2-hexoxy-2-oxoethyl)-sulfinyl]-N,N-dimethylacetamide. |
| 2-hydroxyimino-2-dodecylsulfinyl-N-cyclopropylacetamide. | Butyl chloroformate. | Butyl carbonate of 2-hydroxyimino-2-dodecylsulfinyl-N-cyclopropylacetamide. |
| 2-hydroxyimino-2-t-butylsulfinyl-N-t-butylacetamide. | 1-chloroethyl chloroformate. | 1-chloroethyl carbonate of 2-hydroxyimino-2-t-butylsulfinyl-N-t-butylacetamide. |
| 2-hydroxyimino-2-methylsulfinyl-N-dodecylacetamide. | ...do... | 1-chloroethyl carbonate of 2-hydroxyimino-2-methylsulfinyl-N-dodecylacetamide. |
| 2 hydroxyimino-2-methylsulfinyl-N,N-hexamethyleneacetamide. | Methyl chloroformate. | Methyl carbonate of 2-hydroxyimino-2-methylsulfinyl-N,N-hexamethyleneacetamide. |
| 2 hydroxyimino-2-isopropylsulfinyl-N,N-pentamethyleneacetamide. | ...do... | Methyl carbonate of 2-hydroxyimino-2-isopropylsulfinyl-N,N-pentamethyleneacetamide. |
| 2-hydroxyimino-2-(3-cyclopentenylsulfinyl-N-methyl-N-butylacetamide. | Dichloroacetyl chloride. | Dichloroacetate of 2-hydroxyimino-2-(3-cyclopentenylsulfinyl)-N-methyl-N-butylacetamide. |
| 2-hydroxyimino-2-(3-cyclopentenyl-sulfinyl-N-methyl-N-butylacetamide. | ...do... | Dichloroactate of 2-hydroxyimino-2-t-butylsufinyl-N,N-diethylactamide. |
| 2-hydroxyimino-2-(2-ethoxy-2-oxoethyl)-sulfinyl]-N,N-pentamethyleneacetamide. | Phenylacetyl chloride. | Phenylacetate of 2-hydroxyimino-2-[(2-ethoxy-2-oxoethyl)-sulfinyl]-N,N-pentamethyleneacetamide. |
| 2-hydroxyimino-2-octylsulfinyl-N,N-dimethylacetamide. | ...do... | Phenylacetate of 2-hydroxyimino-2-octylsulfinyl-N,N-dimethylacetamide. |
| 2-hydroxyimino-2.methylsulfinyl-N,N-(3-oxapentamethylene)acetamide. | Octanoyl chloride. | Octanoate of 2-hydroxyimino-2-methylsulfinyl-N,N-(3-oxapentamethylene)acetamide. |
| 2-hydroxyimino-2-methylsulfinyl-N-phenylacetamide. | ...do... | Actanoate of 2-hydroxyimino-2-methylsulfinyl-N-phenylacetamide. |
| 2-hydroxyimino-2-ethylsulfinyl-N,N-didodecylacetamide. | Chlopropanecarbonyl chloride. | Cyclopropanecarboxylate of 2-hydroxy imino-2-ethylsulfinyl-N,N-didodecylacetamide. |
| 2-hydroxyimino-2-butylsulfinyl-N-benzylacetamide. | 12,12,12-trichlorododecanoyl chloride. | 12,12,12-trichlorododecanoate of 2-hydroxyimino-2-butylsulfinyl-N-benzylacetamide. |

TABLE III—Continued

| Starting material | Acid chloride | Product |
|---|---|---|
| 2-hydroxyimino-2-cyclohexylsulfinyl-N,N-hexamethyleneacetamide. | 6,6-dimethoxyhexanoyl chloride. | 6,6-dimethoxyhexanoate of 2-hydroxyimino-2-cyclohexylsulfinyl-N,N-hexamethyleneacetamide. |
| 2-hydroxyimino-2-(3-cyclopentenylsulfinyl)-N-methyl-N-butylacetamide. | Nonanoyl chloride. | Nonanoate of 2-hydroxyimino-2-(3-cyclopentenylsulfinyl)-N-methyl-N-butylacetamide. |
| 2-hydroxyimino-2-t-butylsulfinyl-N,N-diethylacetamide. | 3-cycloheptenecarbonyl chloride. | 3-cycloheptenecarboxylate of 2-hydroxyimino-2-t-butylsulfinyl-N,N-diethylacetamide. |
| 2-hydroxyimino-2-[(2-ethoxy-2-oxoethyl)-sulfinyl]-N,N-pentamethyleneacetamide. | 3-cycloheptenecarbonyl. | 3-cycloheptenecarboxylate of 2-hydroxyimino-2-l(2-ethoxy-2-oxoethyl)-sulfinyl]-N,N-pentamethyleneacetamide. |
| 2-hydroxyimino-2-octylsulfinyl-N,N-dimethylacetamide. | Methoxyacetyl chloride. | Methoxyacetate of 2-hydroxyimino-2-octylsulfinyl-N,N-dimethylacetamide. |
| -hydroxyimino-2-methylsulfinyl-N,N-(3-oxapentamethylene)acetamide. | ...do... | Methoxyacetate of 2-hydroxyimino-2-methylsulfinyl-N,N-(3-oxapentamethylene)acetamide. |
| 2-hydroxyimino-2-methylsulfinyl-N-phenylacetamide. | Isobutanoyl chloride. | Isobutanoate of 2-hydroxyimino-2-methylsulfinyl-N-phenylacetamide. |
| -hydroxyimino-2-ethylsulfinyl-N,N-didodecylacetamide. | ...do... | Isobutanoate of 2-hydroxyimino-2-ethylsulfinyl-N,N-didodecylacetamide. |
| 2-hydroxyimino-2-butylsulfinyl-N-benzylacetamide. | Decanoyl chloride. | Decanoate of 2-hydroxyimino-2-butylsulfinyl-N-benzylacetamide. |
| 2-hydroxyimino-2-cyclohexylsulfinyl-N,N-hexamethyleneacetamide. | Carboethoxyacetyl chloride. | Carboethoxyacetate of 2-hydroxyimino-2-cyclohexylsulfinyl-N,N-hexamethyleneacetamide. |
| 2-hydroxyimino-2-methylsulfinyl-N,N-dimethylacetamide. | Ethyl oxalyl chloride. | Ethyl oxalate of 2-hydroxyimino-2-methylsulfinyl-N,N-dimethylacetamide. |
| 2-hydroxyimino-2-decylsulfinyl-N,N-dimethylacetamide. | 12-carbomethoxydodecanoyl chloride. | 12-carbomethoxydodecanoate of 2-hydroxyimino-2-decylsulfinyl-N,N-dimethylacetamide. |
| 2-hydroxyimino-2-(3-chloropropylsulfinyl)-N,N-dimethylacetamide. | Decahydronaphthanecarbonyl chloride. | Decahydronaphthanecarboxylate of 2-hydroxyimino-2-(3-chloropropylsulfinyl)-N,N-dimethylacetamide. |
| 2-hydroxyimino-2-allylsulfinyl-N,N-dimethylacetamide. | ...do... | Decahydronaphthanecarboxylate of 2-hydroxyimino-2-allylsulfinyl-N,N-dimethylacetamide. |
| 2-hydroxyimino-2-cyclohexylsulfinyl-N,N-dimethylacetamide. | Butyl chloroformate. | Butyl carbonate of 2-hydroxyimino-2-cyclohexylsulfinyl-N,N-dimethylacetamide. |
| 2-hydroxyimino-2-sec-butylsulfinyl-N,N-dimethylacetamide. | ...do... | Butyl carbonate of 2-hydroxyimino-2-sec-butylsulfinyl-N,N-dimethylacetamide. |
| 2-hydroxyimino-2-benzylsulfinyl-N,N-diisopropylacetamide. | Methyl chloroformate. | Butyl carbonate of 2-hydroxyimino-2-benzylsulfinyl-N,N-diisopropylacetamide. |
| 2-hydroxyimino-2-phenylsulfinyl-N,N-diethylacetamide. | β-chloroethyl chloroformate. | β-chloroethyl carbonate of 2-hydroxyimino-2-phenylsulfinyl-N,N-diethylacetamide. |
| 2-hydroxyimino-2-cyclohexylmethylsulfinyl-N-methyl-N-propylacetamide. | ...do... | β-choroethyl carbonate of 2-hydroxyimino-2-cyclohexylmethylsulfinyl-N-methyl-N-propyl cetamide. |
| 2-hydroxyimino-2-methylsulfinyl-N,N-dimethylacetamide. | Ethyl oxalyl chloride. | Ethyl oxalate of 2-hydroxyimino-2-methylsulfinyl-N,N-dimethylacetamide. |
| 2-hydroxyimino-2-decylsulfinyl-N,N-dimethylacetamide. | Methyl oxalyl chloride. | Methyl oxalate of 2-hydroxyimino-2-decylsulfinyl-N,N-dimethylacetamide. |
| 2-hydroxyimino-2-(3-chloropropylsulfinyl)-N,N-dimethylacetamide. | Methyl chloroformate. | Methyl carbonate of 2-hydroxyimino-2(3-chloropropylsulfinyl)-N,N-dimethylacetamide. |
| 2-hydroxyimino-2-allylsulfinyl-N,N-dimethylacetamide. | ...do... | Methyl carbonate of 2-hydroxyimino-2-allylsulfinyl-N,N-dimethylacetamide. |
| 2-hydroxyimino-2-cyclohexylsulfinyl-N,N-dimethylacetamide. | 2-norbornanecarbonyl chloride. | 2-norbornanecarboxylate of 2-hydroxyimino-2-cyclohexylsulfinyl-N,N-dimethylacetamide. |
| 2-hydroxyimino-2-sec-butylsulfinyl-N,N-dimethylacetamide. | Trimethylacetyl chloride. | Trimethylacetate of 2-hydroxyimino-2-sec-butylsulfinyl-N,N-dimethylacetamide. |
| 2-hydroxyimino-2-benzylsulfinyl-N,N-diisopropylacetamide. | Propionyl chloride. | Propionate of 2-hydroxyimino-2-benzylsulfinyl-N,N-diisopropylacetamide. |
| 2-hydroxyimino-2-phenylsulfinyl-N,N-diethylacetamide. | Cyclohexanecarbonyl chloride. | Cyclohexanecarboxylate of 2-hydroxyimino-2-phenylsulfinyl-N,N-diethylacetamide. |
| 2-hydroxyimino-2-cyclohexylmethylsulfinyl-N-methyl-N-propylacetamide. | Adamantanecarbonyl chloride. | Adamantanecarboxylate of 2-hydroxyimino-2-cyclohexylmethylsulfinyl-N-methyl-N-propylacetamide. |
| 2-hydroxyimino-2-(3-cyclopentenylsulfinyl)-N-methyl-N-butylacetamide. | 2,2-diethoxydodecanoyl chloride. | 2,2-diethoxydodecanoate of 2-hydroxyimino-2-(3-cyclopentenylsulfinyl)-N-methyl-N-butylacetamide. |
| 2-hydroxyimino-2-t-butylsulfinyl-N,N-diethylocetamide. | 2-cyclobutenylacetyl chloride. | 2-cyclobutenylacetate of 2-hydroxyimino-2-t-butylsulfinyl-N,N-diethylocetamide. |
| 2-hydroxyimino-2-[(2-ethoxy-2-oqoethyl)-sulfinyl]-N,N-pentamethyleneacetamide. | 3-cyclodecenylacetyl chloride. | 3-cyclodecenylacetate of 2-hydroxyimino-2-[(2-ethoxy-2-oxoethyl)-sulfinyl]-N,N-pentamethyleneacetamide. |
| 2-hydroxyimino-2-octylsulfinyl-N,N-dimethylacetamide. | 2-cyclohexenylacetyl chloride. | 3-cyclohexenylacetate of 2-hydroxyimino-2-octylsulfinyl-N,N-dimethylacetamide. |

EXAMPLE 25

Preparation of 2,2'-(p-xylylene-α,α-disulfonyl)bis(2-hydroxyimino-N,N-dimethylacetamide)

Part A.—To a solution of 15.1 parts of 2-chloro-2-hydroxy-imino-N,N-dimethylacetamide in 100 parts of methanol at room temperature is added slowly 8.5 parts of p-xylylyl dimercaptan. The reaction is then chilled to 0–10° C. and a solution of 4 parts of sodium hydroxide in 46 parts of water is added dropwise. The 2,2'-(p-xylylene-α,α' - dithio)bis(2-hydroxyimino - N,N - dimethylacetamide) which forms and precipitates, is filtered, washed with water, then acetone dried to furnish 18.1 parts of this intermediate, m.p. 249° C.

Part B.—To a slurry of 8 parts of the above intermediate in 100 parts of glacial acetic acid at 70° C. is added dropwise 15.2 parts of 40% peracetic acid. All of the solids go into solution during the addition of the oxidant. The reaction is then cooled to room temperature during which time the product crystallizes. The solid is filtered and recrystallized from a large volume of methanol to provide 3.5 parts of the desired 2,2'-(p-xylylene-α,α'-disulfonyl)bis(2 - hydroxyimino-N,N-dimethylacetamide), m.p. 177–178° C.

EXAMPLE 26

Preparation of 2,2'-(1,10-decamethylenedisulfonyl)bis-(2-hydroxyimino-N,N-dimethylacetamide)

Part A.—Replacing the p-xylylyl dimercaptan of Example 25 Part A with 10.3 parts of 1,10-decanedithiol one similarly obtains 2,2'-(1,10-decamethylenedithiol bis(2-hydroxyimino-N,N-dimethylacetamide) which is washed with water and recrystallized from isopropanol to furnish 14.7 parts of the required intermediate, m.p. 174–177° C.

Part B.—To a solution of 4.35 parts of 2,2'-(1,10-decamethylenedithio)bis(2 - hydroxyimino-N,N-dimethylacetamide) in 200 parts of chloroform at room temperature is added dropwise 7.6 parts of 40% peracetic acid. The reaction is mildly exothermic. After the exotherm subsides, the solvent is evaporated and the product recrystalized from acetonitrile to furnish the 2,2'-(1,10-decamethylenedisulfonyl)bis(2-hydroxyimino - N,N - dimethylacetamide), m.p. 151–161° C.

EXAMPLE 27

Preparation of 2-[2-(diethylcarbamoylhydroximinomethylsulfinyl)ethylsulfonyl]-2-hydroximino - N,N - diethylacetamide To a mixture of 2.8 parts of 2,2'-(1,2-ethylenedithio) bis(2-hydroxyimino-N,N-diethylacetamide) (prepared by previously described methods) in 100 parts of chloroform at 50° C. is added dropwise 5.7 parts of 40% peracetic acid. The reaction is maintained at 50° C. for 1 hour after the addition after which the solvent is evaporated to provide the desired 2-[2-(diethylcarbamoylhydroxyiminomethylsulfinyl)ethylsulfonyl] - 2 - hydroximino-N,N-diethylacetamide.

EXAMPLE 28

Preparation of 2,2'-(1,8-octamethylenedisulfinyl)bis(2-hydroxyimino-N,N-dipropylacetamide)

To a solution of 5.2 parts of 2,2'-(1,8-octamethylenedithio)bis(2-hydroxyimino - N,N - dipropylacetamide) in 100 parts of chloroform at 50° C. is added in one portion 3.8 parts of 40% peracetic acid. The reaction is then allowed to cool to room temperature and is evaporated to furnish the 2,2' - (1,8-octamethylenedisulfinyl)bis(2-hydroxyimino-N,N-dipropylacetamide).

The compounds listed under the heading "Product" in Table IV are examples of compounds of formula I where

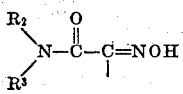

$R^4$=H and $R^1$=—$R^8$—$SO_2$. The compounds are prepared by the procedures illustrated in Example 25. The necessary disulfide intermediates of the formula

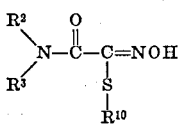

where $R^{10}$ is

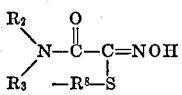

are prepared by the reactions illustrated in reaction sequence (D), where $R^9$ is —$R^8SH$. The final products are prepared by oxidation of the disulfide intermediate with four equivalents of the oxidant.

cites downy mildew of grape; *Pseudoperonospora cubensis*, which incites downy mildew of cucurbits; *Venturia inaequalis*, which incites apple scab; *Uromyces phaseoli*, which incites bean rust; *Puccinia recondita, P. coronata*, and *P. glumarum*, which incite leaf rusts of wheat, oats, and grasses, respectively; *Puccinia graminis tritici*, which incites stem rust of wheat and *Piricularin oryzne* which incites blast of rice.

The compounds of this invention provide protection from damage caused by certain fungi when applied to the proper locus by the methods described hereinafter and at a sufficient rate to exert the desired effect. They are especially suited for the protection of living plants such as fruit-bearing trees, vegetable crops, horticultural crops (including ornamentals, small fruits, and berries), fiber crops, grain and seed crops, sugarcane, sugar beets, pineapple, forage and hay crops, beans, peas, soybeans, peanuts, potatoes, sweet-potatoes, tobacco, hops, turf, and pasture.

Living plants may be protected from fungi by applying one or more of the compounds of this invention to seeds, tubers, bulbs, or other plant reproductive parts prior to planting, as well as to foliage, stems, and/or fruit of the living plant. Living plants may also be protected by dipping the root system.

Preferred rates of application for the compounds of this invention to foliage, stems, and/or fruit of living plants range from 0.25 to 70 kilos of active ingredient per hectare. More preferred rates are in the range of 0.5 to 35 kilos per hectare. The most preferred rates are in the range of 1.0 to 15 kilos pe hectare. The optimum amount within this range depends upon a number of variables which are well known to those skilled in the art of plant protection. These variables include, but are not limited to,

TABLE IV

| Amine | Dithiol | Product |
|---|---|---|
| Didodecylamine | 1,12-dodecane dithiol | 2,2'-(1,12-dodecamethylenedisulfonyl)bis(2-hydroxyimino-N,N-di-n-dodecylacetamide). |
| Diisopropylamine | 1,18-octadecyl dithiol | 2,2'-(1,18-octadecamethylenedisulfonyl)bis(2-hydroxyimino-N,N-diisopropylacetamide). |
| N-methylpropylamine | 1,4-benzene dithiol | 2,2'-(1,4-phenylenedisulfonyl)bis(2-hydroxyimino-N-methyl-N-propylacetamide). |
| Piperidine | 1,6-hexane dithiol | 2,2'-(1,6-hexamethylenedisulfonyl)bis(2-hydroxyimino-N,N-pentamethyleneacetamide). |
| Morpholine | 1,10-decane dithiol | 2,2'-(1,10-decamethylenedisulfonyl)bis(2-hydroxyimino-N,N-3-oxapentamethyleneacetamide). |
| Hexamethyleneimine | do | 2,2'-(1,10-decamethylenedisulfonyl)bis(2-hydroxyimino-N,N-hexamethyleneacetamide). |
| Diallylamine | do | 2,2'-(1,10-decamethylenedisulfonyl)bis(2-hydroxyimino-N,N-diallylacetamide). |
| Aniline | do | 2,2'-(1,10-decamethylenedisulfonyl)bis(2-hydroxyimino-N-phenylacetamide). |
| Aziridine | do | 2,2'-(1,10-decamethylenedisulfonyl)bis(2-hydroxyimino-N,N-dimethyleneacetamide). |
| N-ethylbenzylamine | 1,7-heptane dithiol | 2,2'-(1,7-heptamethylenedisulfonyl)bis(2-hydroxyimino-N-ethyl-N-benzylacetamide). |
| 2-butenylamine | do | 2,2'-(1,7-heptamethylenedisulfonyl)bis(2-hydroxyimino-N-(2-butenyl)acetamide). |
| Cyclohexanemethylamine | do | 2,2'-(1,7-heptamethylenedisulfonyl)bis(2-hydroxyimino-N-(cyclohexymethyl)acetamide). |
| Cycloheptylamine | 1,3-propane dithiol | 2,2'-(1,3-trimethylenedisulfonyl)bis(2-hydroxyimino-N-cycloheptylacetamide). |
| Diethylamine | 1,4-butane dithiol | 2,2'-(1,4-tetramethylenedisulfonyl)bis(2-hydroxyimino-N,N-diethylacetamide). |
| Dibutylamine | 1,9-nonane dithiol | 2,2'-(1,9-nonamethylenedisulfonyl) bis(2-hydroxyimino-N,N-dibutylacetamide). |

A wide variety of fungus-incited diseases of foliage, fruit, stems, and roots of growing plants are controlled by the compounds of this invention without damage to the host. Fruits, tuber, bulbs, roots, seeds, and other plant parts harvested for food, animal feeds, or for other purposes are protected from fungus deterioration during processing, distribution, and storage. Seeds, tuber, cuttings, and other plant propagation materials are protected from fungus attack during handling and storage, as well as in the soil after planting.

The many fungi against which the compounds of this invention are effective may be represented by, but are not limited to, the following: *Phytophthora infestans*, which incites late blight of potato and tomato; *Phytophthora parasitica* and *P. citrophthora*, which incite foot rot and brown fruit rot of citrus; *Plasmopara viticola*, which inthe disease to be controlled, weather conditions expected, the type of crop, stage of development of the crop, and the interval between applications. Applications within the range given may need to be repeated one or many more times at intervals of 1 to 60 days. Application to the foliage, stems, and fruit of living plants at the rates indicated above is generally accomplished by employing sprays, dusts, or aerosols containing the proper amount of active ingredient. For the control of fungi regularly present, applications often start prior to the time that the problem actually appears and continue on a predetermined schedule.

Preferred rates for application to seeds, tubers, bulbs, or other plant reproductive parts range from 25 to 8,000 grams of active compound of this invention per 100 kilos of planting material treated. More preferred rates are in the range of 50 to 4,000 grams of active compound per 100 kilos. The most preferred rates are in the range of 100 to 2,000 grams per 100 kilos. Applications of this type are made from dusts, slurries, or solutions.

Preferred rates for dip applications to roots of living plants are in the range of 1 to 4,000 grams of active ingredient per 100 liters of water or other liquid carrier. More preferred rates are in the range of 2 to 2,000 grams per 100 liters. The most preferred rates are in the range of 4 to 1,000 grams per 100 liters.

Plant parts, such as fruits, tubers, bulbs, roots, and the like, harvested for food or feed are protected from decay and other deterioration caused by fungi during processing, distribution, and storage by treatment with an active compound of this invention. The plant parts to be so protected are dipped in a liquid bath containing the active ingredient, dusted with a finely divided preparation of the active ingredient, sprayed or misted with an aerosol. The liquid bath contains an amount of the active ingredient in the range of 1 to 5,000 parts per million of the weight of the fluid. A more preferred range for the bath is 5 to 2,500 parts per million, and the most preferred range is 10 to 1,000 parts per million. Dusts used for this type of application contain 0.01 to 10% by weight of the active ingredient. More preferred rates are in the range of 0.1 to 5%, and the most preferred rates are in the range of 0.2 to 2.5 percent by weight.

As indicated by the above discussion, the fungicidally active compounds will be applied in a variety of formulations including wettable powders, suspensions, emulsifiable concentrates, dusts, solutions, granules or pellets. These formulations will include one or more compounds of Formula I and can include surface-active agents, solid or liquid diluents and other materials as required to produce the desired formulation.

The surface-active agents act as wetting, dispersing and emulsifying agents which assist dispersion of the active material in the spray, and improve wetting of waxy foliage and the like by the spray. The surfactants can include such anionic, non-ionic and cationic agents as have been used heretofore in pesticidal compositions of similar type. A detailed list of such agents may be found in "Detergents and Emulsifiers Annual," (John W. McCutcheon, Inc.).

Anionic and non-ionic surfactants are preferred. Among the anionic surfactants, preferred ones are alkali and alkaline earth salts of alkylarylsulfonic acids, such as dodecylbenzenesulfonates and alkylnaphthalenesulfonates, dialkyl sodium sulfosuccinate esters, sodium lauryl sulfate, sodium N-methyl-N-oleoyltaurate, sodium dodecyldiphenyl ether disulfonate and the oleic acid ester of sodium isethionate. Among the non-ionic surfactants, preferred ones include alkenylphenyl polyethylene glycol ethers, polyoxyethylene derivatives of sorbitan fatty esters and long-chain alcohols and mercaptans, as well as polyoxyethylene esters of fatty acids.

Preferred dispersants are alkali and alkaline earth salts of lignosulfonic acids, salts of polymerized alkylarylsulfonates which are sold under the "Daxad" and "Darvan" trademarks, as well as methylcellulose, polyvinyl alcohol and the like.

Surfactants are present in compositions of this invention in amounts up to about 20% by weight based on the total weight of the resulting composition. When larger amounts of surfactant are desired, as for improved wetting of, spreading over, or penetration into foliage, mixing in the spray tank is usually preferable for convenience.

Powder and dust preparations can be made by blending the active ingredient, with or without surfactant, with finely divided solids such as talcs, natural clays, pyrophyllite, diatomaceous earth; flours such as walnut shell, wheat, redwood, soya bean and cotton seed; or inorganic substances such as magnesium carbonate, calcium carbonate, calcium phosphate, sodium silicoaluminate, sulfur and lime. In general, storage stability will be best when the system has a near neutral pH and has a low level of moisture. The choice of diluents will then depend on the physical properties and shelf life desired. The compositions are made by thoroughly blending the active ingredient with the diluent and other additives. Usually a grinding step, as in a hammer mill or fluid energy mill, is included. The particles in dust and powder preparations are preferably less than 50 microns in average diameter. With compounds which are highly water insoluble, improved activity may be obtained with still finer grinding.

Preferred wettable powder formulations will contain 40% or more active ingredient together with sufficient surfactant and inert diluent to permit dispersion in water for spray application. Compositions intended for dust application will generally contain less than 50% active ingredient.

Powdered compositions can be converted to granules by adding a liquid, treating mechanically, and usually, drying. Mechanical devices such as granulating pans, mixers and extruders can be used. Compaction devices can be used without a liquid in the mixture. Water soluble binders, such as inorganic salts, urea, ligninsulfonates, methyl cellulose, and the like, can be included in these particulate formulations in amounts up to about 25% by weight of the finished granule or pellet. Such materials also aid in disintegration of the pellet and release of the active ingredient under field conditions. Alternatively, a solution or suspension of the active ingredient can be sprayed on the surface of preformed granules of clay, vermiculite, corn cob and the like. Surfactants may also be included in formulations of the latter type.

Suspension formulations can be made in water, or in organic solvents, or in mixtures of water and water-miscible organic solvents in which the active ingredient has a solubility under about 0.1%. The preparations usually include, in addition to the active ingredient and liquid carrier, surfactants, viscosity control agents, anti-microbial agents and other modifiers. They are prepared by grinding the components in a sand mill or pebble mill preferably until the average particle size is under 20 microns. Hydrocarbon and other flammable carriers should have boiling points above about 125° C. for safety in handling. Suspensions in hydrocarbons are suitable for extension in spray oils and, by inclusion of a suitable emulsifying agent, may also be made sprayable from water.

Organic liquids suitable for preparation of solutions, suspensions and emulsifiable concentrates of the compounds of this invention include alcohols, glycols, Cellosolves, Carbitols, ketones, esters, sulfamides, amides, paraffinic hydrocarbons, aromatic hydrocarbons and halogenated hydrocarbons. Choice of a liquid is dictated by the solubility of the active compound to be used and whether a suspension or solution is desired. The class of compounds represented by Formula I is particularly variable in solubility characteristics, so it is not possible to generalize in the use of particular solvents for particular purposes.

All compositions intended for spray use can contain minor amounts of additives to reduce foam, inhibit corrosion, prevent claying, reduce caking, etc. as the conditions of use may dictate. The conditions of need for and use of such additives are generally known in the art.

The compounds of this invention can often be used to advantage in combinations or mixtures with one or more of the fungicides, bactericides, insecticides, acaricides, or nematocides available on the market today. The combinations or mixtures can be made by the applicator just prior to use (as in the tank of a sprayer) or included in a single composition by the manufacturer or a subsequent processor as will be discussed in more detail hereinafter. Illustrative of the materials that may be included in such combinations or mixtures are the following:

1,2,3,4,10,10-hexachloro-1,4,4a,5,8,8a-hexahydro-1,4-endo-exo-5,8-dimethanonaphthalene (aldrin);

1,2,3,4,5,6-hexachlorocyclohexane (lindane);
2,3,4,5,6,7,8,8-octachloro-4,7-methano-3a-4,7,7a-tetrahydroindane;
1,2,3,4,10,10-hexachloro-6,7-epoxy-1,4,4a,5,6,7,8,8a-octahydro-1,4-*endo-exo*-5,8-dimethanonaphthalene (dieldrin);
1,2,3,4,10,10-hexachloro-6,7-epoxy-1,4,4a,5,6,7,8,8a-octahydro-1,4-*endo-endo*-5,6-dimethano-naphthalene (endrin);
1 (or 3a), 4,5,6,7,8,8-heptachloro-3a,4,7,7a-tetrahydro-4,7-methanoindene;
1,1,1-trichloro-2,2-bis(*p*-methoxyphenyl)ethane (methoxychlor);
1,1-dichloro-2,2-bis(*p*-chlorophenyl)ethane;
chlorinated camphene having a chlorine content of 67–69%;
2-nitro-1,1-bis(*p*-chlorophenyl)butane;
S-methyl N-[(methylcarbamoyl)oxy]thioacetimidate (methomyl)
S-methyl 1-(dimethylcarbamoyl)-N-[(methylcarbamoyl)oxy]thioformimidate;
1-naphthyl-N-methylcarbamate ("Sevin®" carbaryl);
methylcarbamic acid, ester with phenol, 4-(dimethylamino)-3,5-dimethyl;
methylcarbamic acid, ester with 1,3-dithiolan-2-one oxime;
O,O-diethyl O-[2-isopropyl-4-methylpyrimid-6-yl] thiophosphate;
O,O-dimethyl 1-hydroxy-2,2,2,-trichloroethyl phosphonate ((diazinon);
O,O-dimethyl S-(1,2-dicarbethoxyethyl)dithiophosphate (malathion);
O,O-dimethyl O-*p*-nitrophenyl thiophosphate (methyl parathion);
O,O-diethyl O-*p*-nitrophenyl thiophosphate (parathion);
O,O-dimethyl O-(3-chloro-4-nitrophenyl) thiophosphate;
dl-2-cyclopentenyl-4-hydroxy-3-methyl-2-cyclopenten-1-one chrysanthemumate;
O,O-dimethyl O,O-(2,2-dichlorovinyl) phosphate (DDVP dichlorovos);
mixture containing 53.3% "Bulan," 26.7% "Prolan" and 20.0% related compounds;
O,O-dimethyl O-(2,4,5-trichlorophenyl) phosphorothioate;
O,O-dimethyl S-(4-oxo-1,2,3-benzotriazine-3(4H)-yl-methyl) phosphorodithioate "Guthion®" azinphosmethyl);
bis-(dimethylamino)phosphonous anhydride;
O,O-diethyl O-(2-keto-4-methyl-1-7a'-pyranyl) thiophosphate;
O,O-diethyl (S-ethylmercaptomethyl) dithiophosphate;
calcium arsenate;
sodium aluminofluoride;
dibasic lead arsenate;
2'-chloroethyl 1-methyl-2-(*p-tert*-butylphenoxy)ethyl sulfite;
azobenzene;
ethyl 2-hydroxy-2,2-bis(4-chlorophenyl)acetate;
O,O-diethyl O-[2-(ethylmercapto)ethyl] thiophosphate Systox® demeton);
2,4-dinitro-6-*sec*-butylphenol;
toxaphene;
O-ethyl O-*p*-nitrophenyl benzenethiophosphonate EPN®);
4-chlorophenyl 4-chlorobenzenesulfonate;
*p*-chlorophenyl phenyl sulfone;
tetraethyl pyrophosphate (TEPP);
1,1-bis-(*p*-chlorophenyl)ethanol;
1,1-bis-(*p*-chlorophenyl)2,2,2-trichloroethanol (Kelthane® dicofol);
*p*-chlorophenyl *p*-chlorobenzyl sulfide;
bis-(*p*-chlorophenoxy)methane;
3-(1-methyl-2-pyrrolidyl)pyridine;
mixed ester of pyrethrolone and cinerolone keto-alcohols and two chrysanthemum acids;
cube and derris, both whole root and powdered;
ryanodine;
mixture of alkaloids known as veratrine;
2-(*o*-hydroxyphenyl)-1-3-dithiolane methylcarbamate ester;
2-(*o*-hydroxyphenyl)-1,3-dioxolane methylcarbamate ester;
dl-2-allyl-4-hydroxy-3-methyl-2-cyclopenten-1-one esterfied with a mixture of cis and trans dl-chrysanthemum monocarboxylic acids;
butoxypolypropylene glycol;
ethyl 2-hydroxy-2-2-bis(4-chlorophenyl)acetate (chlorobenzilate);
*p*-dichlorobenzene;
2-butoxy-2'-thiocyanodiethyl ether;
naphthalene;
methyl O-carbamylthiolacetohydroxamate;
1,1-dichloro-2,2-bis(*p*-ethylphenyl)ethane;
methyl O-(methylcarbamyl)thiolacetohydroxamate (methomyl);
*p*-dimethylaminobenzenediazo sodium sulfonate;
2-heptadecylimidazoline acetate (glyodin);
tetralkylthiuram disulfides such as tetramethylthiuram disulfide or tetraethyl thiuram disulfide;
sulfur;
metal salts of ethylenebisdithiocarbamic acid or propylene-bisdithiocarbamic acids, e.g. manganese, zinc, iron and sodium salts (maneb or zineb);
pentachloronitrobenzene;
2-1-(1-methylheptyl)-4,6-dinitrophenyl crotonate and other nitrophenol derivatives;
methyl 1-(butylcarbamoyl)-2-benzimidazole carbamate (benomyl);
methyl-2-benzimidazole carbamate;
2-carboxyamino-1-benzimidazole carboxylic acid, dimethyl ester;
*n*-dodecylguanidine acetate (dodine);
N-(trichloromethylthio)phthalimide;
N-trichloromethylthiotetrahydrophthalimide (captan);
cis-N-[(1,1,2,2-tetrachloroethyl)thio]-4-cyclohexene-1,2-dicarboximide;
2,4-dichloro-6-(*o*-chloroaniline)-*s*-triazine ("Dyrene®");
bis (4-chlorophenyl)-3-pyridylmethanol;
3,3'-ethylenebis(tetrahydro-4-6-dimethyl-2H-1,3,5-thiadiazine-2-thione);
Triphenyltin hydroxide;
1,4-dichloro-2,5-dimethoxybenzene;
Triphenyltin acetate;
metal (e.g. iron, sodium and zinc), ammonium and amine salts of dialkyldithiocarbamic acids;
2,6-dichloro-4-nitroanaline;
tetrachloronitroananisole;
hexachlorobenzene;
methyl carbamic acid, ester with 2-methyl-2-(methylthio) propionaldehyde oxime (Temik®);
hexachlorophene;
methylmercury nitrile;
tetrachloroquinone;
2,3-dichloro-1,4-napthoquinone;
N-trichloromethylthiophthalimide;
cupric hydroxide;
tribasic copper sulfate;
fixed copper;
1,2-dibromo-2-chloropropene;
1,2-dibromo-3-chloropropane;
dichloropropane-dichloropropene mixture;
ethylene dibromide;
chloropicrin;
sodium monomethyldithiocarbamate;
tetrachloroisophthalonitrile;
2,3-dihydro-5-carboxanilide-6-methyl-1,4-oxathiin-4,4-dioxide;
streptomycin or other antibiotics;
2-(2,4,5-trichlorophenoxy)propionic acid;
*p*-chlorophenoxyacetic acid;

1-naphthaleneacetamide; and
N-(1-naphthyl)acetamide.

The agricultural chemicals listed above are merely exemplary of the compounds which can be mixed with the active compounds of this invention and are not intended to any way limit the invention.

The additional pesticides are employed in mixtures or combinations in amounts ranging from one-tenth to ten times that of the compound or compounds of this invention. The proper choice of amounts for the added pesticides is readily made by one skilled in the art of protecting plants from pest depredations.

The following examples are given to further illustrate methods of application and formulations of this invention. Percentages are by weight.

EXAMPLE A

Wettable Powder

| | Percent |
|---|---|
| 2 - hydroxyimino - 2 - octylsulfonyl-N,N-diethylacetamide | 50 |
| Dioctyl sodium sulfosuccinate | 1.5 |
| Sodium ligninsulfonate | 3 |
| Low viscosity methyl cellulose | 1.5 |
| Attapulgite | 44 |

The ingredients are thoroughly blended, passed through an air mill, to produce an average particle size under 15 microns, reblended, and sifted through a U.S.S. No. 50 sieve (0.3 mm. opening) before packaging.

All compounds of the invention may be formulated in the same manner.

The above composition is suspended in water at 400 p.p.m., 80 p.p.m. and 16 p.p.m. of the active ingredient. Three potted tomato plants are sprayed to run-off with each of these suspension. Additional plants are sprayed with plain water to serve as checks. After the spray deposit has dried, the plants are uniformly inoculated with a zoospore suspension of the fungus *Phytophthora infestans*, the incitant of tomato late blight disease. The plants are placed under saturated moisture conditions in a humidity chamber for 24 hours, and further incubated for 3 days on a greenhouse bench.

Disease readings are taken at the time when the plants treated with water are completely defoliated by the late blight disease. Plants treated with the 16 p.p.m. concentration are about 50% defoliated. Plants treated with the 80 p.p.m. concentration have only a few lesions and are rated as about 15% defoliated. Tomatoes treated with the 400 p.p.m. concentration are essentially disease free and only an occasional lesion may be found.

EXAMPLE B

Wettable Powder

| | Percent |
|---|---|
| Methylcarbamate of 2-hydroxyimino-2-methylsulfonyl-N,N-hexamethyleneacetamide | 80 |
| Sodium alkylnaphthalenesulfonate | 2 |
| Sodium lignin sulfonate | 2 |
| Synthetic amorphous silica | 3 |
| Kaolinite | 13 |

The ingredients are thoroughly blended, passed through a hammer mill to produce an average particle size under 40 microns, reblended and sifted through a U.S. No. 50 sieve (0.3 mm. openings) before packaging. 2,2'-(1,10-decamethylenedisulfonyl) - bis(2 - hydroxyimino-N,N-diethylacetamide) is also formulated by the above procedure.

The above composition may be used in a manner similar to Example A with similar results.

EXAMPLE C

Wettable Powder

| | Percent |
|---|---|
| Mono-(2-chloroethyl) carbonate of 2-hydroxyimino-2-methylsulfonyl-N,N-dimethylacetamide | 65 |
| Dodecylphenol polyethylene glycol ether | 2 |
| Sodium ligninsulfonate | 4 |
| Sodium silicoaluminate | 6 |
| Montmorillonite (calcined) | 23 |

The ingredients are thoroughly blended. The liquid surfactant is added by spraying upon the solid ingredients in the blender. After grinding in a hammer mill to produce particles essentially all below 200 microns, the material is reblended and sifted through a U.S.S. No. 50 sieve (0.3 mm. opening) and packaged.

The above composition may be used in a manner similar to Example A with similar results.

EXAMPLE D

High Strength Concentrate and Dust

| | Percent |
|---|---|
| Methylcarbamate of 2 - hydroxyimino-2-cyclohexylsulfonyl-N,N-dimethylacetamide | 98.5 |
| Silica aerogel | 0.5 |
| Synthetic amorphous fine silica | 1.0 |

The ingredients are blended and ground in a hammer mill to produce a high strength concentrate essentially all passing U.S.S. No. 50 mesh. This material may then be shipped or formulated in a number of ways. For example, the following 25% dust can be prepared.

| | Percent |
|---|---|
| High strength concentrate | 25.4 |
| Pyrophyllite | 74.6 |

The materials are thoroughly blended and packaged for use.

The above 25% dust is applied to potted tomato plants by blowing a measured quantity into a chamber containing the plants. The quantity used is equal to 2.5 kilograms of the active ingredient per hectare. Additional plants are dusted with pyrophyllite alone to serve as checks. These tomato plants are uniformly sprayed with a zoospore suspension of the fungus *Phytophthora infestans*, and placed in a saturated humidity chamber for 24 hours. After 3 additional days of incubation on a greenhouse bench the checks are completely defoliated by the late blight disease. Plants dusted with the composition of this invention remain disease free.

EXAMPLE E

Dust

| | Percent |
|---|---|
| Methoxyacetate of 2-hydroxyimino-2-methyl-sulfonyl-N,N-dimethylacetamide | 10 |
| Attapulgite | 10 |
| Talc | 80 |

The active ingredient is blended with attapulgite and then passed through a hammer mill to produce particles of active substantially all below 200 microns. The ground concentrate is then blended with powdered talc until homogeneous.

The above composition may be used in a manner similar to Example D with similar results.

EXAMPLE F

Water Soluble Powder

| | Percent |
|---|---|
| 2-hydroxyimino - 2 - methylsulfonyl-N,N-dimethylacetamide | 95.0 |
| Dioctyl sodium sulfosuccinate | 0.5 |
| Calcium ligninsulfonate | 1.0 |
| Silica aerogel | 3.5 |

The ingredients are blended and coarsely ground in a hammer mill so that only a few percent of the active exceeds 250 microns in size. When added to water with stirring, the coarse powder initially disperses and then the active ingredient dissolves so that no further stirring is needed during application.

The above composition is dissolved in water at 80 p.p.m., 16 p.p.m. and 3.2 p.p.m. of the active ingredient. Four potted apple seedlings selected to have at least two disease-susceptible leaves at the growing point, are sprayed to runoff with each of these suspensions. Four additional seedlings are sprayed with water to serve as checks. After the spray deposit has dried, the susceptible growing tips are inoculated with a conidial suspension of the fungus *Venturia inaequalis,* commonly, apple scab. This inoculation is effected by use of a hand-operated atomizer from above at 20 p.s.i. Still wet, the seedlings are placed in a humidity chamber at 20° C. and 100% relative humidity for 48 hours after which they are removed to a greenhouse bench for further incubation. Disease ratings are made after thirteen days. At this reading the inoculated leaves of the checks are covered with a velvety coating of sporulating fungus. The seedlings treated with the 3.2 p.p.m. concentration have about 50% disease coverage; those treated with the 16 p.p.m. treatment have only a few lesions comprising less than 10% of the leaf surfaces. The 80 p.p.m. concentration completely controls apple scab.

EXAMPLE G

Aqueous Suspension

| | Percent |
|---|---|
| p-Bromocarbanilate of 2-hydroxyimino-2-methylsulfonyl-N,N-dimethylacetamide | 25 |
| Hydrated attapulgite | 3 |
| Crude calcium/magnesium lignin sulfonate | 10 |
| Sodium dihydrogen phosphate | 0.5 |
| Water | 61.5 |

The ingredients are ground together in a ball or roller mill until the solid particles have been reduced to diameters under 5 microns.

The above composition may be used in a manner similar to Example F with similar results.

EXAMPLE H

Emulsifiable Concentrate

| | Percent |
|---|---|
| Chloroacetate of 2-hydroxyimino-2-methylsulfonyl-N,N-dimethylacetamide | 32.5 |
| Chlorobenzene | 61.5 |
| Sorbitan monostearate and polyoxyethylene condensates thereof | 6.0 |

The above composition may be used in a manner similar to Example F with similar results.

Any of the chlorobenzene-soluble compounds of this invention may be formulated in a similar manner and when applied as in Example F, give similar results.

EXAMPLE I

Emulsifiable Concentrate

| | Percent |
|---|---|
| 2 - hydroxyimino - 2 - octylsulfonyl-N,N-diethylacetamide | 25 |
| Xylene | 72 |
| Blend of oil soluble sulfonates and polyoxyethylene ethers | 3 |

The ingredients are combined and stirred with gentle warming to speed solution. A fine screen filter is included in the packaging line to insure the absence of any undissolved matter in the final product.

The above composition is diluted in water at 400 p.p.m. of the active ingredient. Three potted tomato plants, 8''–9'' tall, are sprayed to run-off with the suspension. Three additional tomato plants are sprayed with water to serve as untreated controls. The spray deposit is allowed to dry overnight on the plants after which one inch of rainfall is simulated on a turntable using two spray nozzles from above and one from below. After drying, again overnight, the plants are uniformly inoculated with a zoospore suspension of the fungus *Phytophthora infestans,* the incitant of tomato late blight disease. Still wet with inoculum, the plants are placed in a humidity chamber at 20° C. and 100% relative humidity for approximately 20 hours then further incubated for 3 days on a greenhouse bench. Disease ratings are made at this time.

The untreated controls are completely defoliated by the late blight disease. The treated plants, on the other hand, are essentially disease free.

Any of the xylene-soluble compounds of this invention, such as 2,2'-(1,8-octamethylenedisulfonyl)bis(2-hydroxyimino-N,N-dipropylacetamide), can be formulated in a similar manner and when applied, give similar results.

EXAMPLE J

Solution

| | Percent |
|---|---|
| 2 - hydroxyimino - 2 - octylsulfonyl-N,N-diethylacetamide | 35 |
| Dimethylformamide | 65 |

The ingredients are combined and stirred to produce a solution suitable for direct application.

What is claimed is:

1. A compound of the formula:

$$\begin{array}{c} R^2 \quad O \\ \diagdown \quad \| \\ N-C-C=N-O-R^4 \\ \diagup \quad | \\ R^3 \quad S(O)_n \\ \quad | \\ \quad R^1 \end{array}$$

wherein
n is 1 or 2;
$R^1$ is alkyl of 1 through 12 carbon atoms; alkyl of 3 through 12 carbon atoms substituted with 1 chlorine atom; alkenyl of 3 through 4 carbon atoms; cycloalkyl of 3 through 8 carbon atoms; cycloalkylalkyl of 6 through 7 carbon atoms; phenyl; benzyl; or $$\begin{array}{c} O \quad R^2 \\ \| \quad \diagup \\ R^4-O-N=C-C-N \\ \quad | \quad \diagdown \\ -R^8-S(O)_p \quad R^3 \end{array}$$

wherein $R^2$, $R^3$ and $R^4$ are as defined below, p is 1 or 2, and $R^8$ is phenylene, xylylene, or alkylene of 2 through 18 carbon atoms;

$R^2$ and $R^3$ are each separately selected from the group consisting of alkyl of 1 through 12 carbon atoms; alkenyl of 3 through 4 carbon atoms; cycloalkyl of 3 through 10 carbon atoms; cycloalkenyl of 5 through 8 carbon atoms; cycloalkylalkyl of 6 through 7 carbon atoms; or benzyl; with the provisos that (1) only one of $R^2$ and $R^3$ can be benzyl, and (2) the sum of carbon atoms in $R^2$ and $R^3$ can total no more than 12, except where both $R^2$ and $R^3$ are alkyl;

$R^4$ is hydrogen;

$$\begin{array}{c} O \quad H \\ \| \quad \diagup \\ -C-N \\ \quad \diagdown \\ \quad R^5 \end{array}$$

wherein $R^5$ is alkyl of 1 through 8 carbon atoms; propargyl; alkenyl of 3 through 4 carbon atoms; cycloalkyl of 3 through 8 carbon atoms; benzyl; phenyl; or phenyl substituted with 1 or 2-substituents selected from halogen, nitro, methoxy, and methyl.

2. Compound of Claim 1 having the formula $$\begin{array}{ccc} R^2 \quad O & & O \quad R^2 \\ \diagdown \quad \| & & \| \quad \diagup \\ N-C-C=NOH & HON=C-C-N \\ \diagup \quad | & & | \quad \diagdown \\ R^3 \quad SO_2-\!\!-\!\!-R^8-\!\!-\!\!-SO_2 \quad R^3 \end{array}$$

wherein

R² and R³ are each separately selected from the group consisting of alkyl of 1 through 6 carbon atoms; and R⁸ is phenylene; xylylene; or alkylene of 2 through 12 carbon atoms.

3. Compound of Claim 2: 2,2′-(1,4-tetramethylenedisulfonyl)bis(2-hydroxyimino-N,N-diethylacetamide).

4. A compound of Claim 1 wherein R⁴ is hydrogen.

5. A compound of Claim 1 wherein R¹ is

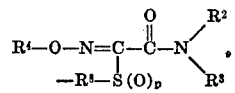

6. A compound of Claim 5 wherein R⁴ is hydrogen.

7. The compound of Claim 1 in which R¹, R² and R³ are each methyl.

8. The compound of Claim 1 in which R¹ is cyclohexyl, R² and R³ are each methyl, and R⁴ is H.

9. The compound of Claim 1 in which R¹ is octyl, R² and R³ are each ethyl, and R⁴ is H.

10. The compound of Claim 1 in which R¹ is hexyl, R² and R³ are each ethyl, and R⁴ is H.

11. Compound of Claim 1 in which R¹ is dodecyl, R² and R³ are each ethyl, and R⁴ is H.

12. Compound of Claim 1 in which R¹ is methyl, R² and R³ are each ethyl, and R⁴ is H.

References Cited

UNITED STATES PATENTS

| | | | |
|---|---|---|---|
| 3,318,681 | 5/1967 | Yates | 260—453 R |
| 3,530,220 | 9/1970 | Buchanan | 424—320 |
| 3,657,307 | 4/1972 | Summers | 424—298 |
| 3,337,396 | 8/1967 | Spurr, Jr. | 260—566 AC |
| 3,301,883 | 1/1967 | Gruber | 260—453 R |
| 3,338,945 | 8/1967 | Dunbar | 424—303 |
| 3,217,037 | 11/1965 | Payne, Jr., et al. | 260—566 AC |

OTHER REFERENCES

Metcalf et al.: "Metabolism of 2-Methyl, Etc.," (1966), J. Ag. & Food Chem., 14, pp. 579–84 (1966).

GLENNON H. HOLLRAH, Primary Examiner

U.S. Cl. X.R.

260—239 A, 239 B, 247.1, 293.62, 293.85, 326.82, 453 R, 558 S, 562 S, 562 N; 424—244, 248, 267, 274, 320, 324

PO-1050
(5/69)

UNITED STATES PATENT OFFICE
CERTIFICATE OF CORRECTION

Patent No. 3,819,700     Dated June 25, 1974

Inventor(s) Russell F. Bellina

It is certified that error appears in the above-identified patent and that said Letters Patent are hereby corrected as shown below:

In Column 1, line 5, after "19703" insert --, assignor to E. I. du Pont de Nemours and Company, Wilmington, Delaware--.

Signed and sealed this 29th day of October 1974.

(SEAL)
Attest:

McCOY M. GIBSON JR.
Attesting Officer

C. MARSHALL DANN
Commissioner of Patents